(12) United States Patent
Ballantyne et al.

(10) Patent No.: US 11,800,065 B2
(45) Date of Patent: *Oct. 24, 2023

(54) MOBILE IMAGE SURVEILLANCE SYSTEMS AND METHODS

(71) Applicant: Geotab Inc., Oakville (CA)

(72) Inventors: William John Ballantyne, Kingston (CA); Javed Siddique, York (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,550

(22) Filed: Aug. 18, 2022

(65) Prior Publication Data

US 2023/0056150 A1 Feb. 23, 2023

Related U.S. Application Data

(60) Provisional application No. 63/274,195, filed on Nov. 1, 2021, provisional application No. 63/235,062, filed on Aug. 19, 2021.

(51) Int. Cl.
| | |
|---|---|
| *H04B 7/185* | (2006.01) |
| *H04N 7/18* | (2006.01) |
| *G06V 20/52* | (2022.01) |
| *G06V 20/56* | (2022.01) |
| *G01C 21/36* | (2006.01) |
| *G06F 3/04842* | (2022.01) |
| *G06F 3/04847* | (2022.01) |

(52) U.S. Cl.
CPC ......... *H04N 7/181* (2013.01); *G01C 21/3614* (2013.01); *G01C 21/3667* (2013.01); *G06V 20/52* (2022.01); *G06V 20/56* (2022.01); *G06F 3/04842* (2013.01); *G06F 3/04847* (2013.01)

(58) Field of Classification Search
CPC .............. H04N 7/181; G01C 21/3614; G01C 21/3667; G06V 20/52; G06V 20/56; G06F 3/04842; G06F 3/04847
USPC ...................................................... 348/143
See application file for complete search history.

(56) References Cited

U.S. PATENT DOCUMENTS

| | | |
|---|---|---|
| 8,791,806 B2 | 7/2014 | Granruth |
| 8,930,072 B1 | 1/2015 | Lambert |
| 8,952,819 B2 | 2/2015 | Nemat-Nasser |
| 9,240,080 B2 | 1/2016 | Lambert |
| 9,280,857 B2 | 3/2016 | Lambert |
| 9,292,980 B2 | 3/2016 | Cook |
| 9,298,575 B2 | 3/2016 | Tamari |
| 9,344,683 B1 | 5/2016 | Nemat-Nasser |
| 9,358,926 B2 | 6/2016 | Lambert |
| 9,389,147 B1 | 7/2016 | Lambert |
| 9,405,970 B2 | 8/2016 | Israel |

(Continued)

OTHER PUBLICATIONS

Extended European Search Report for European Application No. 22203183.3, dated Feb. 10, 2023, 12 Pages.

*Primary Examiner* — Gims S Philippe
(74) *Attorney, Agent, or Firm* — Mark J. Pringle-Rigby

(57) ABSTRACT

Detection models are distributed as needed to a select subset of image capture devices, based on geographic location and time of the image capture devices. Each image capture device which receives a model processes image data according to the model, and provides a notification of any detected instances of an event the model is trained to detect. Distribution and detection can be based on historical data or live data.

15 Claims, 14 Drawing Sheets

(56) References Cited

U.S. PATENT DOCUMENTS

| | | | |
|---|---|---|---|
| 9,449,229 B1 * | 9/2016 | Laska | G08B 13/19606 |
| 9,472,083 B2 | 10/2016 | Nemat-Nasser | |
| 9,595,191 B1 | 3/2017 | Surpi | |
| 9,646,651 B1 | 5/2017 | Richardson | |
| 9,761,063 B2 | 9/2017 | Lambert | |
| 9,792,740 B2 | 10/2017 | Lambert | |
| 9,996,756 B2 | 6/2018 | Hoye | |
| 10,152,870 B1 | 12/2018 | Williams | |
| 10,155,445 B2 | 12/2018 | Nemat-Nasser | |
| 10,166,934 B2 | 1/2019 | Nemat-Nasser | |
| 10,204,159 B2 | 2/2019 | Angel | |
| 10,276,212 B2 | 4/2019 | Richardson | |
| 10,496,891 B2 | 12/2019 | Sai | |
| 10,686,976 B2 | 6/2020 | Nalepka | |
| 10,785,524 B1 | 9/2020 | Morris | |
| 10,800,416 B2 | 10/2020 | Aine | |
| 10,885,360 B1 | 1/2021 | Daniels | |
| 10,893,238 B2 * | 1/2021 | Eilertsen | H04N 7/181 |
| 11,010,640 B1 | 5/2021 | Daniels | |
| 11,080,568 B2 | 8/2021 | Elhattab | |
| 11,126,910 B1 | 9/2021 | Akhtar et al. | |
| 11,157,723 B1 | 10/2021 | Shah | |
| 11,243,505 B2 * | 2/2022 | Strohmenger | G05B 23/0237 |
| 11,310,549 B2 | 4/2022 | Morris | |
| 11,345,279 B2 | 5/2022 | Kopp | |
| 11,380,194 B2 | 7/2022 | Sze et al. | |
| 11,475,766 B1 * | 10/2022 | Carson | G06F 16/434 |
| 11,587,417 B2 * | 2/2023 | Madden | G08B 13/19686 |
| 2016/0343145 A1 | 11/2016 | Israel | |
| 2016/0360157 A1 | 12/2016 | Renkis | |
| 2018/0075309 A1 * | 3/2018 | Sathyanarayana | G05D 1/0055 |
| 2019/0041998 A1 | 2/2019 | Katz | |
| 2019/0197369 A1 | 6/2019 | Law | |
| 2020/0151611 A1 | 5/2020 | McGavran | |
| 2020/0207358 A1 | 7/2020 | Katz | |
| 2020/0216078 A1 | 7/2020 | Katz | |
| 2020/0342230 A1 | 10/2020 | Tsai | |
| 2020/0342235 A1 | 10/2020 | Tsai | |
| 2020/0342611 A1 | 10/2020 | Elhattab | |
| 2020/0388150 A1 * | 12/2020 | Herson | G06V 20/54 |
| 2021/0019528 A1 * | 1/2021 | Ghadyali | G06T 7/292 |
| 2021/0041259 A1 | 2/2021 | Filip | |
| 2021/0201051 A1 | 7/2021 | Deselaers | |
| 2021/0227031 A1 | 7/2021 | Elhattab | |
| 2021/0241000 A1 | 8/2021 | Pfeiffer | |
| 2021/0397908 A1 | 12/2021 | Elhattab | |
| 2021/0406587 A1 | 12/2021 | Mayer | |
| 2021/0406610 A1 | 12/2021 | Moskalev | |
| 2022/0392342 A1 | 12/2022 | Fields et al. | |

* cited by examiner

MOBILE IMAGE SURVEILLANCE SYSTEMS AND METHODS

PRIOR APPLICATION DATA

This patent application claims priority to U.S. Provisional Patent Application No. 63/235,062 titled Distributed Mobile Surveillance Network, filed on Aug. 19, 2021; and to U.S. Provisional Patent Application No. 63/274,195 titled Mobile Video Surveillance System and Methods, filed on Nov. 1, 2021, both of which are incorporated by herein in their entirety.

BACKGROUND

Data collected at an edge device is sometimes uploaded from the edge device to the cloud for analysis, such as by trained machine learning models. However, cloud-based analysis sacrifices response time of detecting events occurring at the edge, in return for a reduction in processing and memory requirements of edge devices. Further, transmitting data for cloud-based analysis consumes bandwidth. In some instances, edge-based analysis for detecting an event at the edge is advantageous.

SUMMARY

According to a broad aspect, the present disclosure describes a method comprising: receiving, by a management device, an indication of a first geographic area and a first period of time; receiving, by the management device, an indication of a first model of a plurality of models, the first model for detecting a first event; identifying, by at least one processor of the management device, a subset of at least one image capture device of a plurality of image capture devices, the subset of at least one image capture device being limited to image capture devices which capture image data in the first geographic area within the first period of time; transmitting, by the management device, first model data to each image capture device in the subset of at least one image capture device, the first model data including the first model for detecting the first event; and for each image capture device in the subset of at least one image capture device: storing, by at least one non-transitory processor-readable storage medium of the respective image capture device, the first model data from the management device; processing, by at least one processor of the respective image capture device, image data stored at the at least one non-transitory processor-readable storage medium of the respective image capture device according to the first model, to identify any instances of the first event; and transmitting a notification to be received by the management device, the notification indicative of any identified instances of the first event.

The method may further comprising transmitting, by the management device to each image capture device in the subset of at least one image capture device, time period data indicative of the first period of time. Further, for each image capture device in the subset of at least one image capture device, processing image data stored at the at least one non-transitory processor-readable storage medium of the respective image capture device according to the first model, may comprise processing select image data captured by the respective image capture device within the first period of time.

The method may further comprise transmitting, by the management device to each image capture device in the subset of at least one image capture device, geographic data indicative of the first geographic area. Further, for each image capture device in the subset of at least one image capture device, processing image data stored at the at least one non-transitory processor-readable storage medium of the respective image capture device according to the first model, may comprise processing select image data captured by the respective image capture device in the first geographic area.

Identifying any instance of the first event may include at least one of detecting a first person, an object, status of a person, status of an object, status of infrastructure, or an activity.

Identifying the subset of at least one image capture device of the plurality of image capture devices may comprise: for each image capture device of the plurality of image capture devices, receiving location data and time data for the respective image capture device indicative of geographic location of the respective image capture device over time; and identifying the subset of at least one image capture device as including each image capture device where the respective location data and time data indicates that the respective image capture device was in the first geographic area within the first period of time.

Identifying the subset of at least one image capture device of the plurality of image capture devices may comprise: transmitting, by the management device to each image capture device in the plurality of image capture devices, first request data indicative of the first geographic area and the first period of time; for each image capture device in the plurality of image capture devices: determining, by the respective at least one processor of the respective image capture device, whether historical image data stored in the respective at least one non-transitory processor-readable storage medium was captured in the first geographic area within the first period of time; and transmitting, to the management device, an indication that the respective image capture device captured image data in the first geographic area within the first period of time; and including in the subset of at least one image capture device, each image capture device from which an indication that the respective image capture device captured image data in the first geographic area within the first period of time.

The indication of the first geographic area may indicate an area based on at least one of, GPS coordinates, street address, cross streets, city, community, state, province, country, and cell of a hierarchical geospatial indexing system.

Receiving an indication of the first model of a plurality of models may include receiving a user input by a user interface, the user input indicating a selection by the user of the first model.

Receiving an indication of a first geographic area and a first period of time may comprise: displaying a user interface on a display of a user device, the user interface including an interactive map; receiving a user input indicating the first geographic area on the interactive map; and receiving another user input indicating the first period of time via the user interface of the user device. Receiving a user input indicating the first geographic area on the interactive map may comprise receiving a user input selected from a group of user inputs consisting of: a user-input polygon on the interactive map indicative of a boundary of the first geographic area; a user selection of selectable regions on the interactive map; and a user selection of at least a portion of one or more streets on the interactive map.

Receiving another user input indicating the first period of time via the user interface may comprise receiving a user input to a time slider displayed on the user interface for indicating a start time and end time of the first period of time.

The method may further comprise receiving, by the management device, an indication of a first vehicle vocation, and the subset of at least one image capture device may be further limited to image capture devices which are included in vehicles of different vocation than the first vocation.

The method may further comprise receiving, by the management device, an indication of a first vehicle vocation, and the subset of at least one image capture device may be further limited to image capture devices which are included in vehicles of the first vocation.

The method may further comprise, for each image capture device in the subset of image capture devices, after processing image data according to the first model to identify any instances of the first event, ceasing use of the first model stored at the respective image capture device. For each image capture device in the subset of image capture devices, ceasing use of the first model stored at the respective image capture device may comprise: removing the first model data from the at least one non-transitory processor-readable storage medium of the respective image capture device.

According to another broad aspect, the present disclosure describes a system comprising a plurality of image capture devices and a management device, the system operable to: receive, by the management device, an indication of a first geographic area and a first period of time; receive, by the management device, an indication of a first model of a plurality of models, the first model for detecting a first event; identify, by at least one processor of the management device, a subset of at least one image capture device of the plurality of image capture devices, the subset of at least one image capture device being limited to image capture devices which capture image data in the first geographic area within the first period of time; and transmit, by the management device, first model data to each image capture device in the subset of at least one image capture device, the first model data including the first model for detecting the first event, wherein each image capture device in the subset of at least one image capture device is operable to: store, by at least one non-transitory processor-readable storage medium of the respective image capture device, the first model data from the management device; process, by at least one processor of the respective image capture device, image data stored at the at least one non-transitory processor-readable storage medium of the respective image capture device according to the first model, to identify any instances of the first event; and transmit a notification to be received by the management device, the notification indicative of any identified instances of the first event.

The system may be further operable to transmit, by the management device to each image capture device in the subset of at least one image capture device, time period data indicative of the first period of time; and each image capture device in the subset of at least one image capture device being operable to process image data stored at the at least one non-transitory processor-readable storage medium of the respective image capture device according to the first model, may comprise: each image capture device in the subset of at least one image capture device being operable to process select image data captured by a respective image capture device within the first period of time.

The system may be further operable to transmit, by the management device to each image capture device in the subset of at least one image capture device, geographic data indicative of the first geographic area; and each image capture device in the subset of at least one image capture device being operable to process image data stored at the at least one non-transitory processor-readable storage medium of the respective image capture device according to the first model may comprise: each image capture device in the subset of at least one image capture device being operable to process select image data captured by a respective image capture device in the first geographic area.

Identification of any instance of the first event may include at least one of detecting a first person, an object, status of a person, status of an object, status of infrastructure, or an activity.

The system being operable to identify the subset of at least one image capture device of the plurality of image capture devices may comprise the system being operable to: for each image capture device of the plurality of image capture devices, receive by the management device location data and time data for the respective image capture device indicative of geographic location of the respective image capture device over time; and identify the subset of at least one image capture device as including each image capture device where the respective location data and time data indicates that the respective image capture device was in the first geographic area within the first period of time.

The system being operable to identify the subset of at least one image capture device of the plurality of image capture devices may comprise the system being operable to: transmit, by the management device to each image capture device in the plurality of image capture devices, first request data indicative of the first geographic area and the first period of time; at each image capture device in the plurality of image capture devices: determine, by the respective at least one processor of the respective image capture device, whether historical image data stored in the respective at least one non-transitory processor-readable storage medium was captured in the first geographic area within the first period of time; and transmit, to the management device, an indication that the respective image capture device captured image data in the first geographic area within the first period of time; and include in the subset of at least one image capture device, each image capture device from which an indication that the respective image capture device captured image data in the first geographic area within the first period of time.

The indication of the first geographic area may indicate an area based on at least one of, GPS coordinates, street address, cross streets, city, community, state, province, country, and cell of a hierarchical geospatial indexing system.

The system being operable to receive, by the management device, an indication of the first model of a plurality of models may include: the system being operable to receive, by the management device, a user input by a user interface, the user input indicating a selection by the user of the first model.

The system being operable to receive the indication of the first geographic area and the first period of time may comprise the system being operable to: display a user interface on a display of a user device, the user interface including an interactive map; receive a user input indicating the first geographic area on the interactive map; and receive another user input indicating the first period of time via the user interface of the user device. The system being operable to receive a user input indicating the first geographic area on the interactive map may comprise the system being operable to receive a user input selected from a group of user inputs consisting of: a user-input polygon on the interactive map indicative of a boundary of the first geographic area; a user selection of selectable regions on the interactive map; and a user selection of at least a portion of one or more streets on the interactive map. The system being operable to receive another user input indicating the first period of time via the user interface may comprise: the system being operable to receive a user input to a time slider displayed on the user interface for indicating a start time and end time of the first period of time.

The system may be further operable to receive, by the management device, an indication of a first vehicle vocation, and the subset of at least one image capture device is further limited to image capture devices which are included in vehicles of different vocation than the first vocation.

The system may be further operable to receive, by the management device, an indication of a first vehicle vocation, and the subset of at least one image capture device is further limited to image capture devices which are included in vehicles of the first vocation.

The system may be further operable to: for each image capture device in the subset of image capture devices, after processing image data according to the first model to identify any instances of the first event, cease use of the first model stored at the respective image capture device. For each image capture device in the subset of image capture devices, the system being operable to cease use of the first model stored at the respective image capture device may comprise: each image capture device in the subset of image capture devices being operable to remove the first model data from the at least one non-transitory processor-readable storage medium of the respective image capture device.

According to yet another broad aspect, the present disclosure describes a method comprising: receiving, by a management device, an indication of a first geographic area and a first period of time; receiving, by the management device, an indication of a first model of a plurality of models, the first model for detecting a first event; identifying, by at least one processor of the management device, a subset of at least one image capture device of a plurality of image capture devices, the subset of at least one image capture device being limited to image capture devices which are positioned in the first geographic area within the first period of time; transmitting, by the management device, first model data to each image capture device in the subset of at least one image capture device, the first model data including the first model for detecting the first event; and for each image capture device in the subset of at least one image capture device: storing, by at least one non-transitory processor-readable storage medium of the respective image capture device, the first model data from the management device; processing, by at least one processor of the respective image capture device, live image data captured by the at least one image capture device according to the first model to identify any instances of the first event; and transmitting a notification to be received by the management device, the notification indicative of any identified instances of the first event.

The method may further comprise transmitting, by the management device to each image capture device in the subset of at least one image capture device, time period data indicative of the first period of time. Further, for each image capture device in the subset of at least one image capture device, processing live image data captured by the respective image capture device according to the first model may comprise processing select image data captured by the respective image capture device within the first period of time.

The method may further comprise transmitting, by the management device to each image capture device in the subset of at least one image capture device, geographic data indicative of the first geographic area. Further, for each image capture device in the subset of at least one image capture device, processing live image data captured by the respective image capture device according to the first model may comprise processing select image data captured by the respective image capture device in the first geographic area.

Identifying any instance of the first event may include at least one of detecting a first person, an object, status of a person, status of an object, status of infrastructure, or an activity.

Identifying the subset of at least one image capture device of the plurality of image capture devices may comprise: for each image capture device of the plurality of image capture devices, receiving location data and time data for the respective image capture device indicative of geographic location of the respective image capture device over time; and identifying the subset of at least one image capture device as including each image capture device where the respective location data and time data indicates that the respective image capture device is positioned in the first geographic area within the first period of time.

Identifying the subset of at least one image capture device of the plurality of image capture devices may comprise: transmitting, by the management device to each image capture device in the plurality of image capture devices, first request data indicative of the first geographic area and the first period of time; for each image capture device in the plurality of image capture devices: determining, by the respective at least one processor of the respective image capture device, whether the respective image capture device is positioned in the first geographic area within the first period of time; and transmitting, to the management device, an indication that the respective image capture device is positioned in the first geographic area within the first period of time; and including in the subset of at least one image capture device, each image capture device from which an indication that the respective image capture device is positioned in the first geographic area within the first period of time.

The indication of the first geographic area may indicate an area based on at least one of, GPS coordinates, street address, cross streets, city, community, state, province, country, and cell of a hierarchical geospatial indexing system.

Receiving an indication of the first model of a plurality of models may include receiving a user input by a user interface, the user input indicating a selection by the user of the first model.

Receiving an indication of a first geographic area and a first period of time may comprises: displaying a user interface on a display of a user device, the user interface including an interactive map; receiving a user input indicating the first geographic area on the interactive map; and receiving another user input indicating the first period of time via the user interface of the user device. Receiving a user input indicating the first geographic area on the interactive map may comprise receiving a user input selected from a group of user inputs consisting of: receiving a user-input polygon on the interactive map indicative of a boundary of the first geographic area; receiving a user selection of selectable regions on the interactive map; and receiving a user selection of at least a portion of one or more streets on the interactive map. Receiving another user input indicating the first period of time via the user interface may comprise receiving a user input to a time slider displayed on the user interface for indicating a start time and end time of the first period of time.

The method may further comprise receiving, by the management device, an indication of a first vehicle vocation, and the subset of at least one image capture device may be further limited to image capture devices which are included in vehicles of different vocation than the first vocation.

The method may further comprise receiving, by the management device, an indication of a first vehicle vocation, and the subset of at least one image capture device may be further limited to image capture devices which are included in vehicles of the first vocation.

The method may further comprise, for each image capture device in the subset of image capture devices, after identifying at least one instance of the first event, ceasing use of the first model stored at the respective image capture device. For each image capture device in the subset of image capture devices, ceasing use of the first model stored at the respective image capture device may comprise: removing the first model data from the at least one non-transitory processor-readable storage medium of the respective image capture device.

According to yet another broad aspect, the present disclosure describes a system comprising a plurality of image capture devices and a management device, the system operable to: receive, by the management device, an indication of a first geographic area and a first period of time; receive, by the management device, an indication of a first model of a plurality of models, the first model for detecting a first event; identify, by at least one processor of the management device, a subset of at least one image capture device of the plurality of image capture devices, the subset of at least one image capture device being limited to image capture devices which are positioned in the first geographic area within the first period of time; transmit, by the management device, first model data to each image capture device in the subset of at least one image capture device, the first model data including the first model for detecting the first event; and wherein each image capture device in the subset of at least one image capture device is operable to: store, by at least one non-transitory processor-readable storage medium of the respective image capture device, the first model data from the management device; process, by at least one processor of the respective image capture device, live image data captured by the at least one image capture device according to the first model to identify any instances of the first event; and transmit a notification to be received by the management device, the notification indicative of any identified instances of the first event.

The system may be further operable to transmit, by the management device to each image capture device in the subset of at least one image capture device, time period data indicative of the first period of time. Further, each image capture device in the subset of at least one image capture device being operable to process image data live data captured by the respective image capture device according to the first model, may comprise: each image capture device in the subset of at least one image capture device being operable to process select image data captured by the respective image capture device within the first period of time.

The system may be further operable to transmit, by the management device to each image capture device in the subset of at least one image capture device, geographic data indicative of the first geographic area. Further, each image capture device in the subset of at least one image capture device being operable to process live image data captured by the respective image capture device according to the first model may comprise: each image capture device in the subset of at least one image capture device being operable to process select image data captured by the respective image capture device in the first geographic area.

Identification of any instance of the first event may include at least one of detecting a first person, an object, status of a person, status of an object, status of infrastructure, or an activity.

The system being operable to identify the subset of at least one image capture device of the plurality of image capture devices may comprise the system being operable to: for each image capture device of the plurality of image capture devices, receive by the management device location data and time data for the respective image capture device indicative of geographic location of the respective image capture device over time; and identify the subset of at least one image capture device as including each image capture device where the respective location data and time data indicates that the respective image capture device is positioned in the first geographic area within the first period of time.

The system being operable to identify the subset of at least one image capture device of the plurality of image capture devices may comprise the system being operable to: transmit, by the management device to each image capture device in the plurality of image capture devices, first request data indicative of the first geographic area and the first period of time; at each image capture device in the plurality of image capture devices: determine, by the respective at least one processor of the respective image capture device, whether live image data captured by the respective image capture device was captured in the first geographic area within the first period of time; and transmit, to the management device, an indication that the respective image capture device captured image data in the first geographic area within the first period of time; and include in the subset of at least one image capture device, each image capture device from which an indication that the respective image capture device captured image data in the first geographic area within the first period of time.

The indication of the first geographic area may indicate an area based on at least one of, GPS coordinates, street address, cross streets, city, community, state, province, country, and cell of a hierarchical geospatial indexing system.

The system being operable to receive, by the management device, an indication of the first model of a plurality of models may include: the system being operable to receive, by the management device, a user input by a user interface, the user input indicating a selection by the user of the first model.

The system being operable to receive the indication of the first geographic area and the first period of time may comprise the system being operable to: display a user interface on a display of a user device, the user interface including an interactive map; receive a user input indicating the first geographic area on the interactive map; and receive another user input indicating the first period of time via the user interface of the user device. The system being operable to receive a user input indicating the first geographic area on the interactive map may comprise the system being operable to receive a user input selected from a group of user inputs consisting of: a user-input polygon on the interactive map indicative of a boundary of the first geographic area; a user selection of selectable regions on the interactive map; and a user selection of at least a portion of one or more streets on the interactive map. The system being operable to receive another user input indicating the first period of time via the user interface may comprise: the system being operable to receive a user input to a time slider displayed on the user interface for indicating a start time and end time of the first period of time.

The system may be further operable to receive, by the management device, an indication of a first vehicle vocation, wherein the subset of at least one image capture device is further limited to image capture devices which are included in vehicles of different vocation than the first vocation.

The system may be further operable to receive, by the management device, an indication of a first vehicle vocation, wherein the subset of at least one image capture device is further limited to image capture devices which are included in vehicles of the first vocation.

The system may be further operable to: for each image capture device in the subset of image capture devices, after processing image data according to the first model to identify any instances of the first event, cease use of the first model stored at the respective image capture device. For each image capture device in the subset of image capture devices, the system being operable to cease use of the first model stored at the respective image capture device may comprise: each image capture device in the subset of image capture devices being operable to remove the first model data from the at least one non-transitory processor-readable storage medium of the respective image capture device.

BRIEF DESCRIPTION OF DRAWINGS

Embodiments of the invention are now described by way of non-limiting example and are illustrated in the following figures in which like reference numbers indicate like features, and wherein.

DESCRIPTION

Techniques for deploying inference models on demand for detection of an event corresponding to specific times and places are disclosed herein.

Embodiments of systems and methods for detecting a historical event captured by one or more image capture devices (e.g. video cameras or smart video cameras) are disclosed herein. Upon deployment of a trained model, captured image data representing a geographic area and period of time may be analyzed locally (at the image capture device or proximate device) by the trained model. Once processing of the captured image data is complete, such processing can be ceased. For example, the trained model can be removed from memory at the image capture device, or de-emphasized from the perspective of maintenance and/or updates.

Embodiments of systems and methods for detecting a future event captured by one or more image capture devices (e.g. video cameras or smart video cameras) are disclosed herein. Upon deployment of a trained model, live image data corresponding to a geographic area and period of time may be analyzed locally by the trained model. Once processing of the live image data is complete, such processing can be ceased. For example, the trained model can be removed from memory at the image capture device, or de-emphasized from the perspective of maintenance and/or updates.

Detecting an event may include detecting, identifying and/or classifying an object, person, activity, phenomenon, circumstance, status or occurrence, such as: a vehicle of a particular make, model, and/or colour; a license plate number; a roadway sign, (e.g., stop, yield); pedestrian traffic; a weather condition, (e.g., rain, snow, hail), fire, smoke, destructive/criminal activity; a crosswalk; a person(s) of interest; an empty parking space; a street light; a telephone/cable service pole; a traffic control signal; a roadway; a tree; a shrub; greenery; among others. Other examples include a condition or status of an object, such as: a streetlight is broken (e.g., bulb is off/broken); a telephone/cable service pole is damaged (e.g., not vertical); a traffic control signal is off and/or damaged; a roadway has damage, (e.g., pothole); a tree is damaged, among others.

Figure 1A:
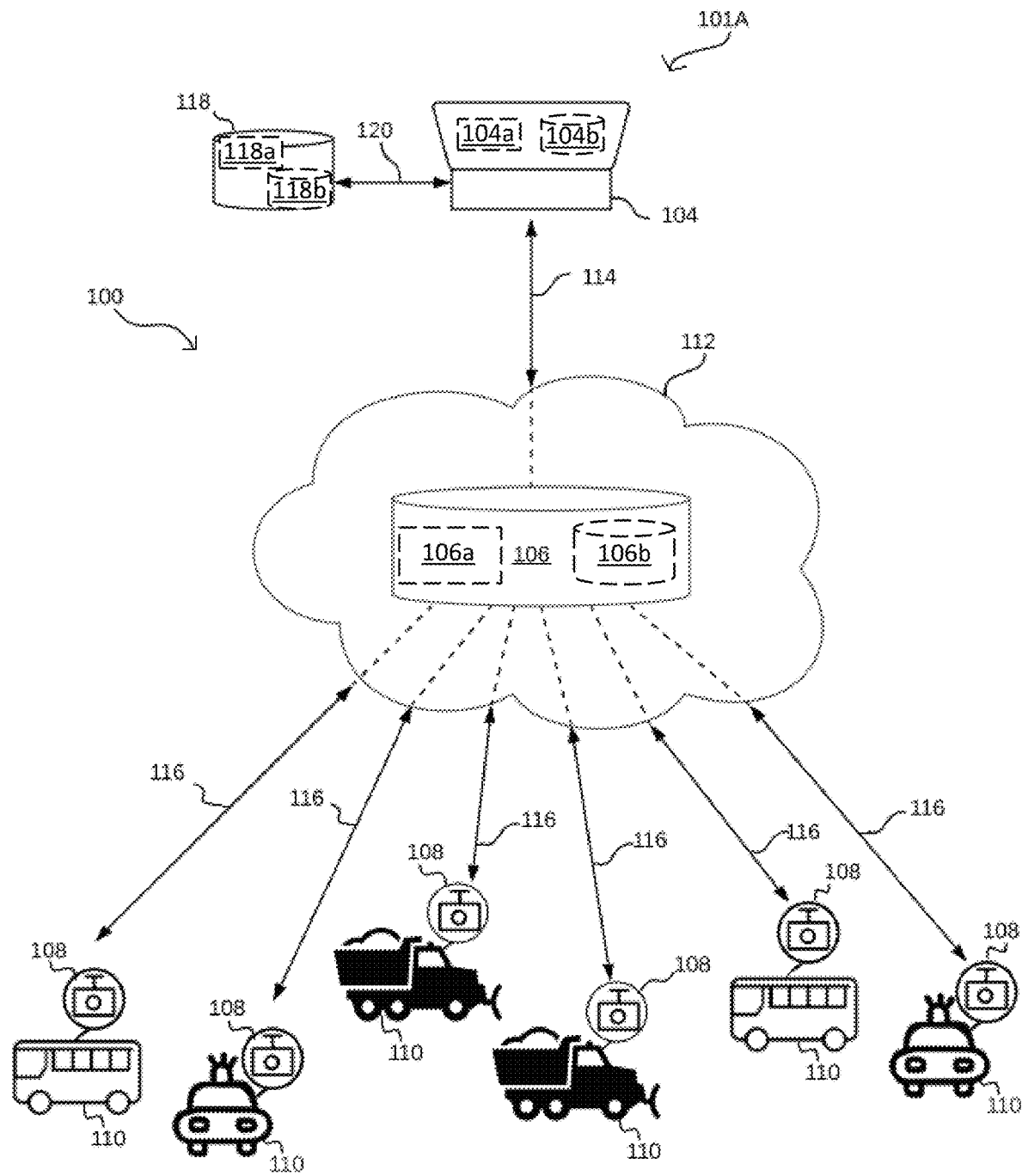
FIG. 1A is a simplified block diagram of an exemplary mobile image surveillance system.
Figure 1B:
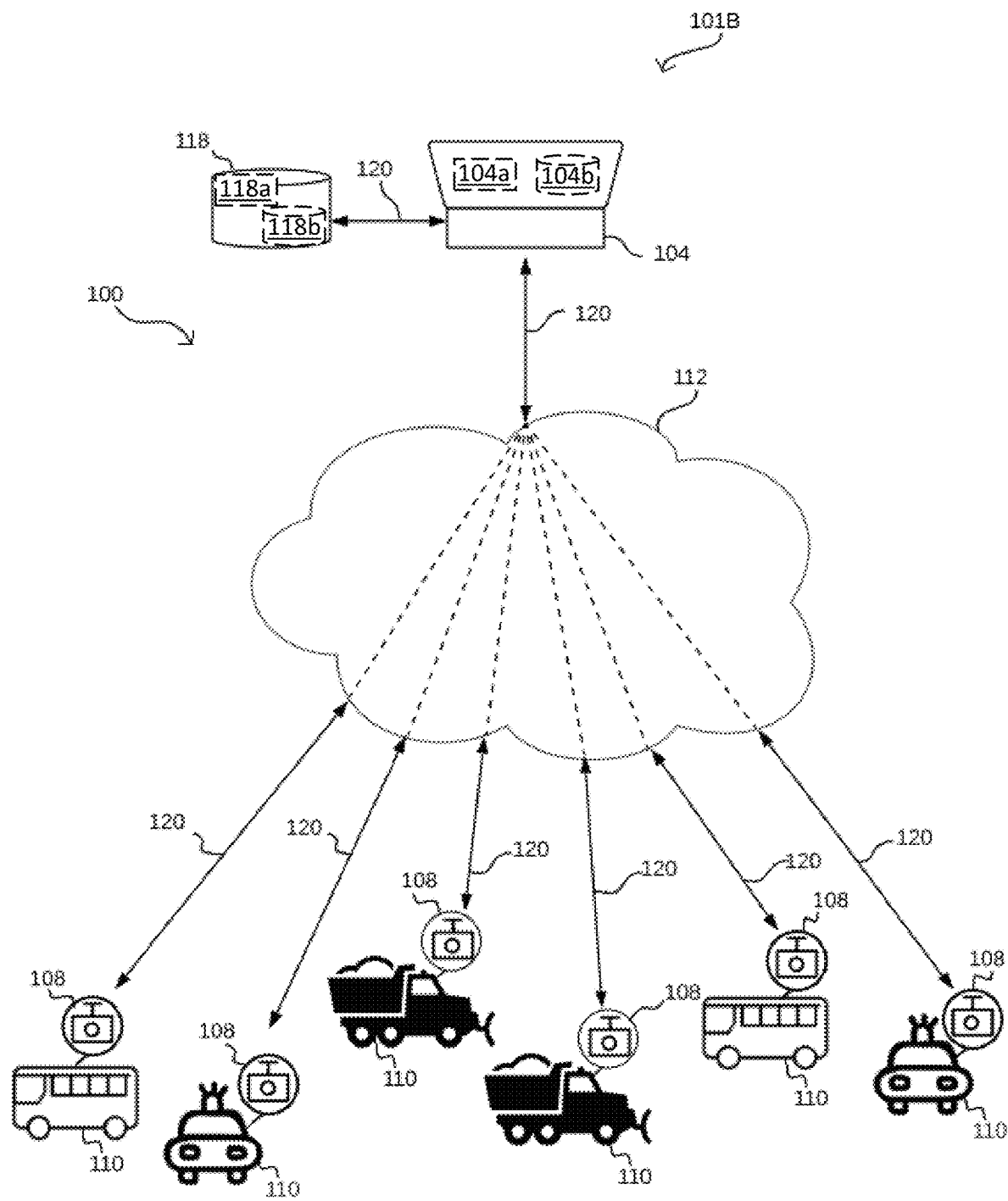
FIG. 1B is a simplified block diagram of another exemplary image video surveillance system.

FIG. 1A and FIG. 1B illustrate block diagrams of exemplary mobile image surveillance systems 101A and 101B, respectively, and exemplary communication network 100 through which mobile video surveillance systems 101A and 101B operate.

Communication network 100 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 100 may operate according to one or more communication protocols, such as, General Packet Radio Service (GPRS), Universal Mobile Telecommunications Service (UMTS), GSM®, Enhanced Data Rates for GSM Evolution (EDGE), LTE™, CDMA, LPWAN, Wi-Fi®, Bluetooth®, Ethernet, HTTP/S, TCP, and CoAP/DTLS, or other suitable protocol. Communication network 100 may take other forms as well.

Mobile image surveillance system 101A includes a plurality of image capture devices 108, which can comprise (and be referred to herein) as smart video cameras (SVCs), though are not strictly limited as such. The plurality of image capture device 108 are positioned at (e.g. mounted in/on, or placed within or on) a plurality of vehicles 110. Image surveillance system 101A also includes cloud server 106, client device 104 and local server 118. Client device 104 is communicatively coupled to local server 118 via communication link 120. Client device 104 is also shown as including at least one processor 104a and at least one non-transitory processor-readable storage medium 104b. The at least one processor 104a can perform acts such as determinations, identification, data analysis, processing, and other appropriate acts, such as acts in the methods described herein. The at least one non-transitory processor-readable storage medium 104b can store any appropriate data, including processor-executable instructions which when executed by the at least one processor 104a cause the client device 104 to perform acts, such as acts of the methods described herein. An exemplary client device may include a personal computer, server, a system, a combination of systems subsystems, and devices. Specific and non-limiting examples of an image capture device or smart video camera include a Netradyne® video camera and a Nauto® video camera. Each image capture device 108 is communicatively coupled to cloud server 106 in cloud 112 via a respective communication link 116. For example, each image capture device 108 and the cloud server 106 are configured to wirelessly communicate to each other. Cloud server 106 is also shown as including at least one processor 106a and at least one non-transitory processor-readable storage medium 106b. The at least one processor 106a can perform acts such as determinations, identification, data analysis, processing, and other appropriate acts, such as acts in the methods described herein. The at least one non-transitory processor-readable storage medium 106b can store any appropriate data, including processor-executable instructions which when executed by the at least one processor 106a cause the cloud server 106 to perform acts, such as acts of the methods described herein. Cloud server 106 is communicatively coupled to client device 104 via communication link 114. For example, each cloud server 106 and client device 104 are configured to wirelessly communicate to each other. As another example, cloud server 106 and client device 104 are configured to communicate with each over a wired connection. In some implementations, local server 118 may be a remote server from client device 104. Local server 118 is also shown as including at least one processor 118a and at least one non-transitory processor-readable storage medium 118b. The at least one processor 118a can perform acts such as determinations, identification, data analysis, processing, and other appropriate acts, such as acts in the methods described herein. The at least one non-transitory processor-readable storage medium 118b can store any appropriate data, including processor-executable instructions which when executed by the at least one processor 118a cause the local server 118 to perform acts, such as acts of the methods described herein.

Mobile image surveillance system 101B includes a plurality of image capture cameras 108, positioned at a plurality of vehicles 110, similar to in FIG. 1A. Image surveillance system 101B also includes client device 104 and local server 118, similar to in FIG. 1A. In the example of FIG. 1B, client device 104 is communicatively coupled to local server 118 via communication link 120. An exemplary client device may include a personal computer, server, a system, a combination of systems subsystems, and devices. Specific and non-limiting examples of an image capture device include a Netradyne® video camera and a Nauto® video camera. Each image capture device 108 is communicatively coupled to client device 104 via a respective communication link 120. For example, each image capture device 108 is configured to wirelessly communicate with client device 104. In some implementations, local server 118 may be a remote server from client device 104. The description of components in mobile image surveillance system 101A in FIG. 1A is applicable to similarly labelled components in mobile surveillance system 101B in FIG. 1B.

Specific and non-limiting examples of vehicle types which each of vehicles 110 can be include: a government owned and operated vehicle, (e.g., as a vehicle for snow clearing, infrastructure maintenance, police enforcement), a public transportation vehicle, (e.g., bus, train), and a privately owned vehicle, (e.g., taxi, courier vehicle), among others.

An image capture device 108 may be mounted to or positioned at a vehicle 110 in a manner such that image capture device 108 captures image data of the environment outside the vehicle 110, e.g., towards the windshield, towards a window, atop the vehicle, etc. Additionally, and/or optionally, an image capture device 108 may be mounted to or positioned at a vehicle 110 in a manner such that the image capture device 108 captures image data of the interior of the vehicle. Interior-facing image capture devices 108 may be useful for detecting an event including detecting a person(s) of interest.

Alternatively, and/or optionally, mobile image surveillance systems 101A, 101B further include one or more image capture devices 108 coupled to a person and/or object wherein the object is not a vehicle. For example, an image capture device 108 is coupled to a person, e.g., police officer body cam.

Optionally, mobile image surveillance systems 101A, 101B further include one or more image capture devices coupled to a stationary object (not shown). For example, a video camera of a private or public security system for monitoring parking lots, inside/outside businesses, malls, university campuses, among others.

Figure 2A:
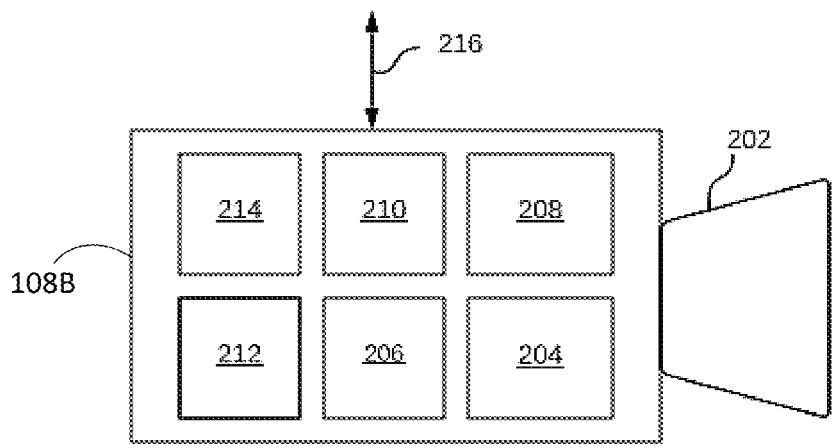
FIG. 2A is a simplified block diagram of an exemplary image capture device.

Now referring to FIG. 2A, shown is a simplified block diagram of exemplary image capture device 108A according to one implementation (as a smart video camera). Image capture device 108A as shown in FIG. 2A can be implemented as any of the image capture devices 108 shown in FIGS. 1A and 1B. Image capture device 108A includes lens 202, optoelectronics 204, at least one processor 206, location module 208, (e.g., including a GPS receiver), wireless communication module 210, (e.g., including a 4G or 5G communication module for providing cellular connectivity) and at least one non-transitory processor-readable storage medium 212. Optionally, the at least one non-transitory processor-readable storage medium 212 includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate with other devices (e.g. cloud device 106 or client device 104 discussed with reference to FIGS. 1A and 1B) over a communication network (e.g. cloud 112 discussed with reference to FIGS. 1A and 1B).

Figure 2B:
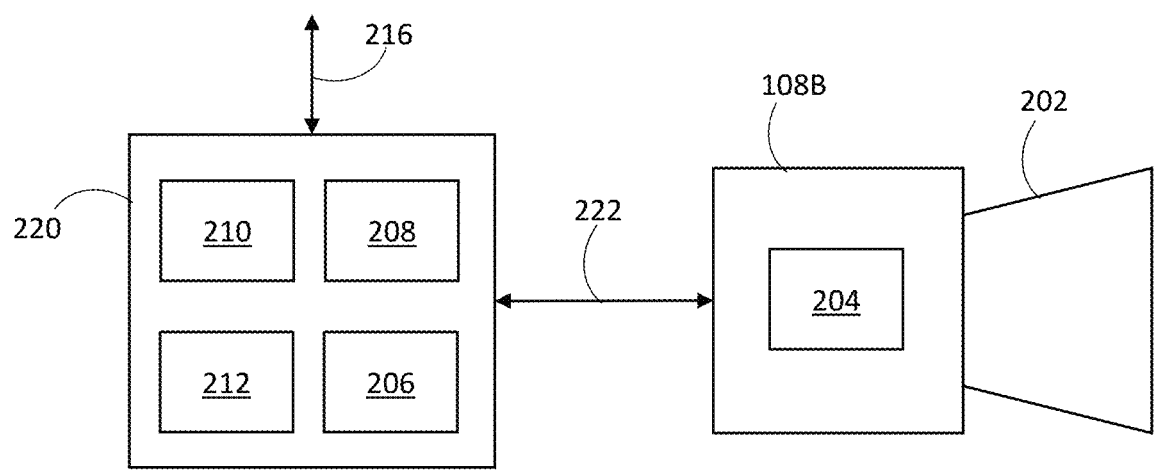
FIG. 2B is a simplified block diagram of an exemplary image capture device communicatively coupled to a peripheral device.

Now referring to FIG. 2B, shown is a simplified block diagram of exemplary image capture device 108B according to one implementation (as a camera which is coupled to a peripheral device, such as a vehicle device). FIG. 2B includes many components with the same reference number as components discussed with reference to FIG. 2A. The description of such components in FIG. 2A is applicable to the similarly numbered components in FIG. 2B. In FIG. 2B, image capture device 108B includes lens 202 and optoelectronics 204. In this implementation, image capture device 108B is itself directed to capturing image data, which is in turn provided to a peripheral device 220 via a communication interface 222 (e.g. a wired or wireless communication interface). In some implementations, peripheral device 222 is vehicle device, such as a telematics monitoring device positioned at a vehicle. In other implementations, peripheral device 222 comprises a collection of components integrated into a vehicle which communicate with each other (e.g. OEM integrated electronics). In FIG. 2B, peripheral device 222 is shown as including the at least one processor 206, the location module 208, the wireless communication module 210, and the at least one non-transitory processor-readable storage medium 212, similar to the components included in image capture device 108A in FIG. 2A. While not illustrated in FIG. 2B to reduce clutter, the at least one non-transitory processor-readable storage medium 212 optionally includes any appropriate number of additional non-transitory processor-readable storage mediums. Wireless communication module 210 is operable to communicate with other devices (e.g. cloud device 106 or client device 104 discussed with reference to FIGS. 1A and 1B) over a communication network (e.g. cloud 112 discussed with reference to FIGS. 1A and 1B).

Collectively, reference to an image capture device 108 or a plurality of image capture device 108 can include image capture device 108A in FIG. 2A or image capture device 108B in FIG. 2B. Further, reference to an image capture device performing acts (such as in the methods discussed herein) can also refer to the peripheral device 220 performing such acts. For example, reference to an image capture device performing processing, determination, identification, storing of data, transmission, or similar acts can refer to an image capture device and peripheral device combination performing these acts.

Process 300

Figure 3:
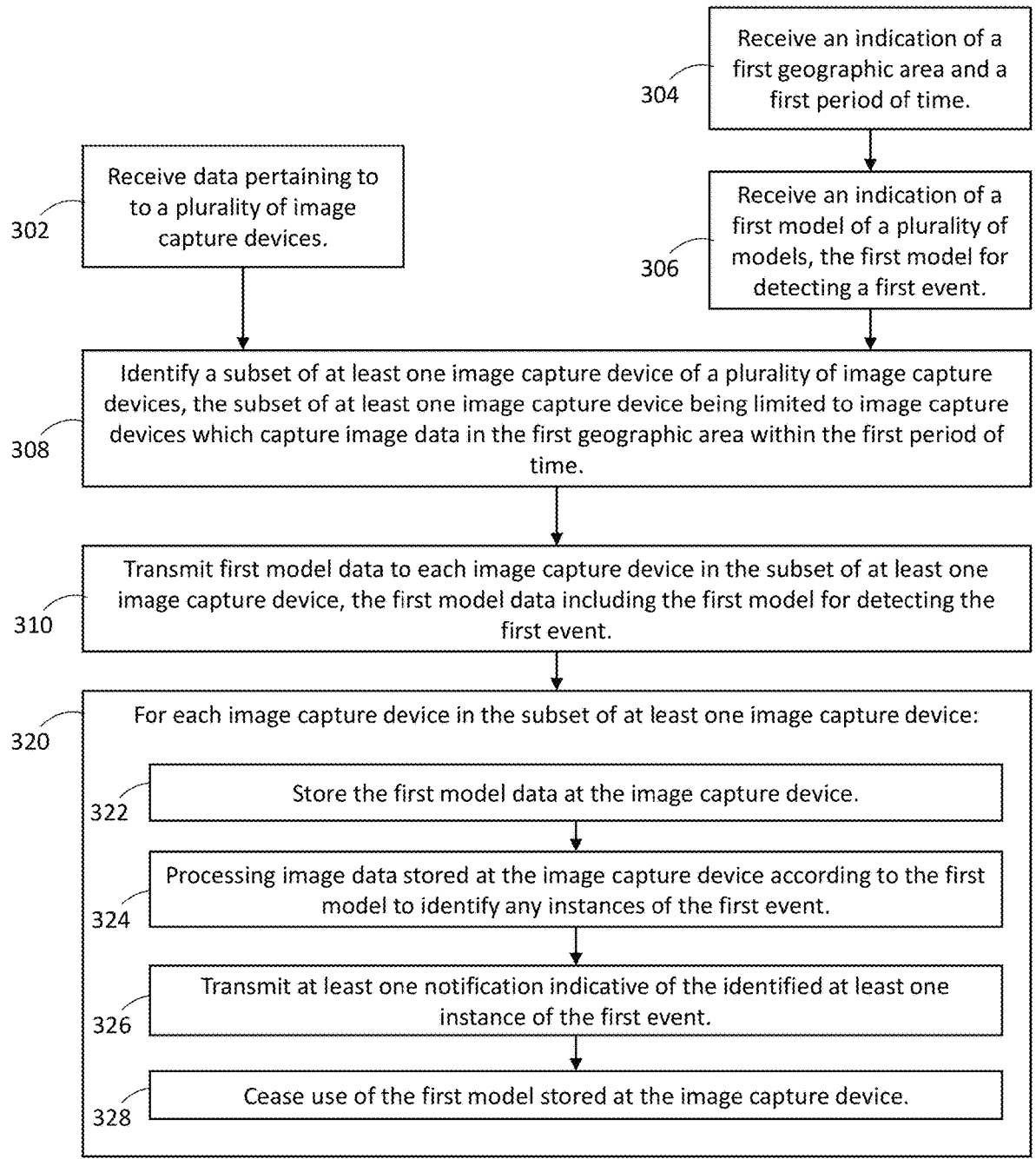
FIG. 3 is a flowchart of an exemplary method for detecting an event.

According to a first exemplary implementation, there is a process for detecting an event wherein the event was captured by an image capture device, i.e., a historical event. Shown in FIG. 3 is a flow diagram of exemplary process 300 for detecting a historical event. Process 300 is described below as being carried out by mobile image surveillance system 101A or mobile image surveillance system 101B. Alternatively, process 300 may be carried out by another system, a combination of systems subsystems, devices or other suitable means provided the operations described herein are performed. Process 300 may be automated, semi-automated and some blocks thereof may be manually performed. Process 300 as illustrated includes acts 302, 304, 306, 308, 310, 322, 324, 326, and 328. Acts 322, 324, 326, and 328 are grouped together in collection of acts 320, performed by each image capture device in an identified subset of at least one image capture device. One skilled in the art will appreciate that additional acts could be added, acts could be removed, or acts could be reordered as appropriate for a given application. With reference to the examples illustrated in FIGS. 1A and 1B, acts can be performed by appropriate components of mobile surveillance systems 101A or 101B. Further, any of the at least one non-transitory processor-readable storage mediums could have processor-executable instructions stored thereon, which when executed by a respective at least one processor cause a respective device to perform a given act of process 300.

An exemplary user of mobile image surveillance systems 101A or 101B is a police enforcement agency. The police enforcement agency utilizes mobile image surveillance system 101A or 101B for detecting events. In this illustrative example, image capture devices 108 are mounted in vehicles 110 including police cruisers, public transportation vehicles, (e.g., buses, trains) and other municipally owned and operated vehicles. Process 300 is applicable to other use cases and other uses beyond law enforcement.

Process 300 begins at block 302 wherein block 302 includes receiving and storing data pertaining to a plurality of image capture devices. For example, with reference to FIGS. 1A and 1B, data pertaining to a plurality of image capture devices 108 is transmitting to a cloud 112 via a plurality of respective communication links 116. In some implementations, the data pertaining to the plurality of image capture devices 108 is stored by at least one non-transitory processor-readable storage medium 106b of cloud server 106 (in FIG. 1A). In other implementations, the data pertaining to the plurality of image capture devices 108 is transmitted to client device 104 via communication link 114, and is stored by at least one non-transitory processor-readable storage medium 104b at client device 104. In yet other implementations, the data pertaining to the plurality of image capture devices 108 is further transmitted to local server 118 via communication link 120, for storage by at least one non-transitory processor-readable storage medium 118b at local server 118. As non-limiting examples, data pertaining to a plurality of image capture devices can include information indicative of identifiers (ID) (e.g., unique identification numbers) of respective image capture devices, respective locations of the image capture devices, and a time the respective image capture device is positioned, was positioned, or is expected to be positioned at the location.

Such data pertaining to the plurality of image capture devices can originate from and be transmitted by image capture devices themselves (e.g. in the case of image capture device 108A in FIG. 2A). Alternatively, such data pertaining to the plurality of image capture devices can be transmitted from respective peripheral devices communicatively coupled to the image capture devices (e.g. in the case of image capture device 108B and peripheral device 220 in FIG. 2B). Such data pertaining to the plurality of image capture devices can alternately be referred to as "image capture device data". In an example, image capture devices 108 periodically transmit data to cloud server 106. The image capture device data includes information indicating an image capture device ID, e.g., ICD108-#, location information, e.g., GPS coordinates, and the time the image capture device was at the location. Cloud server 106 stores the image capture device data in a local non-transitory processor-readable storage medium 106b for future use.

In an illustrative (non-limiting) example scenario that is referenced throughout discussion of process 300, the police enforcement agency is interested in locating a vehicle that was reported to have been involved in an accident on the previous day and did not stay at the scene, i.e., a hit-and-run. A witness indicated that the colour of the vehicle was red, the vehicle type was a sedan, the accident occurred at the intersection of 1st and 11st street, and the accident occurred at approximately 7:20 pm.

Figure 4A:
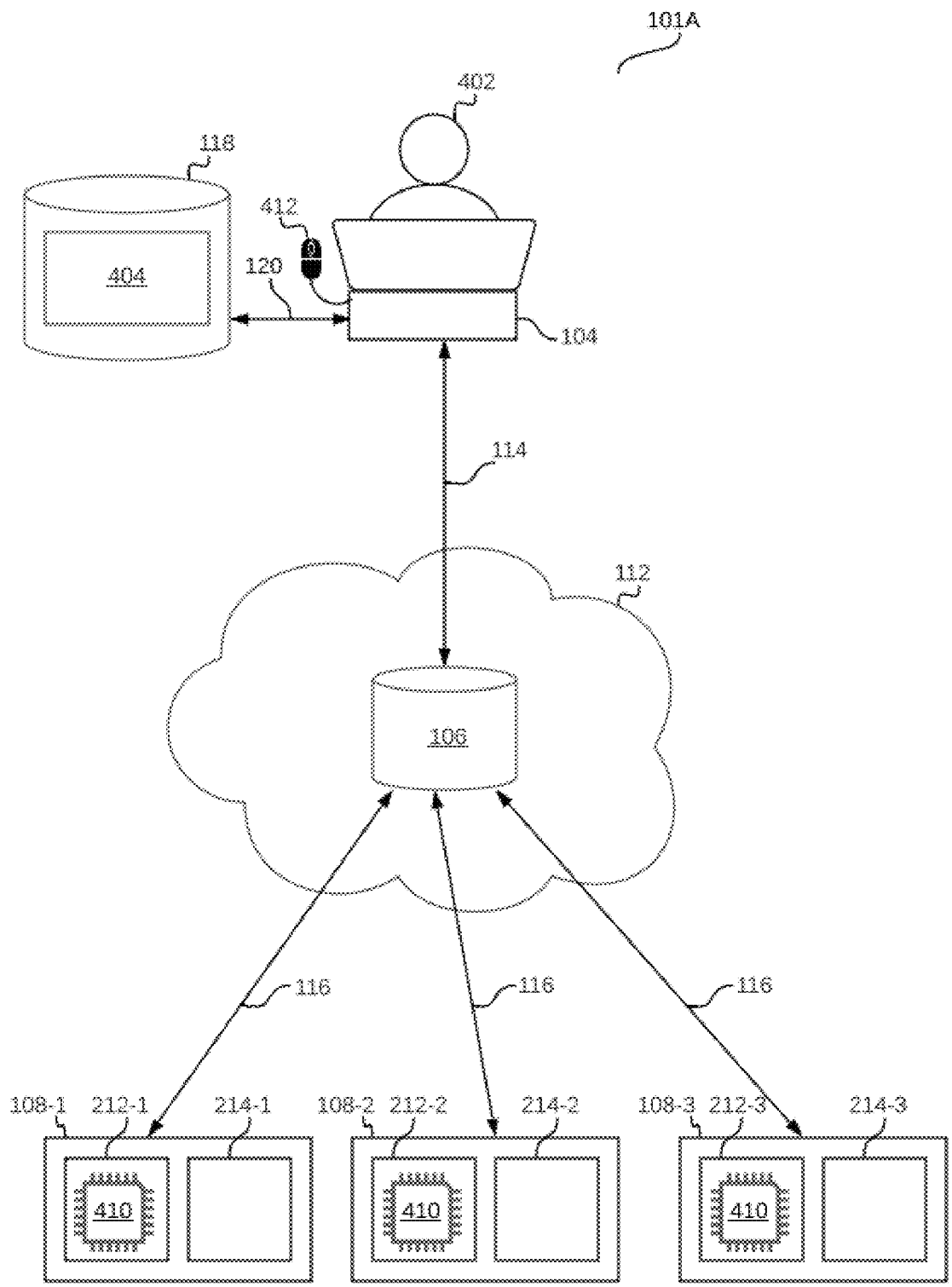
FIG. 4A is a simplified block diagram of an exemplary mobile image surveillance system.

Referring now to FIG. 4A, shown is another block diagram of mobile surveillance system 101A further illustrating operator 402 of mobile surveillance system 101A, input device of client device 104 in the form of a mouse 412, a library 404 of trained models stored in a non-transitory processor-readable storage medium of local server 118, and image capture device 108-1 including non-transitory processor-readable storage mediums 212-1 and 214-1, image capture device 108-2 including non-transitory processor-readable storage mediums 212-2 and 214-2, and image capture device 108-3 including non-transitory processor-readable storage mediums 212-3 and 214-3. Processors and non-transitory processor-readable storage mediums of client device 104, cloud server 106, and local server 118 are not illustrated in FIG. 4A to reduce clutter.

Figure 4B:
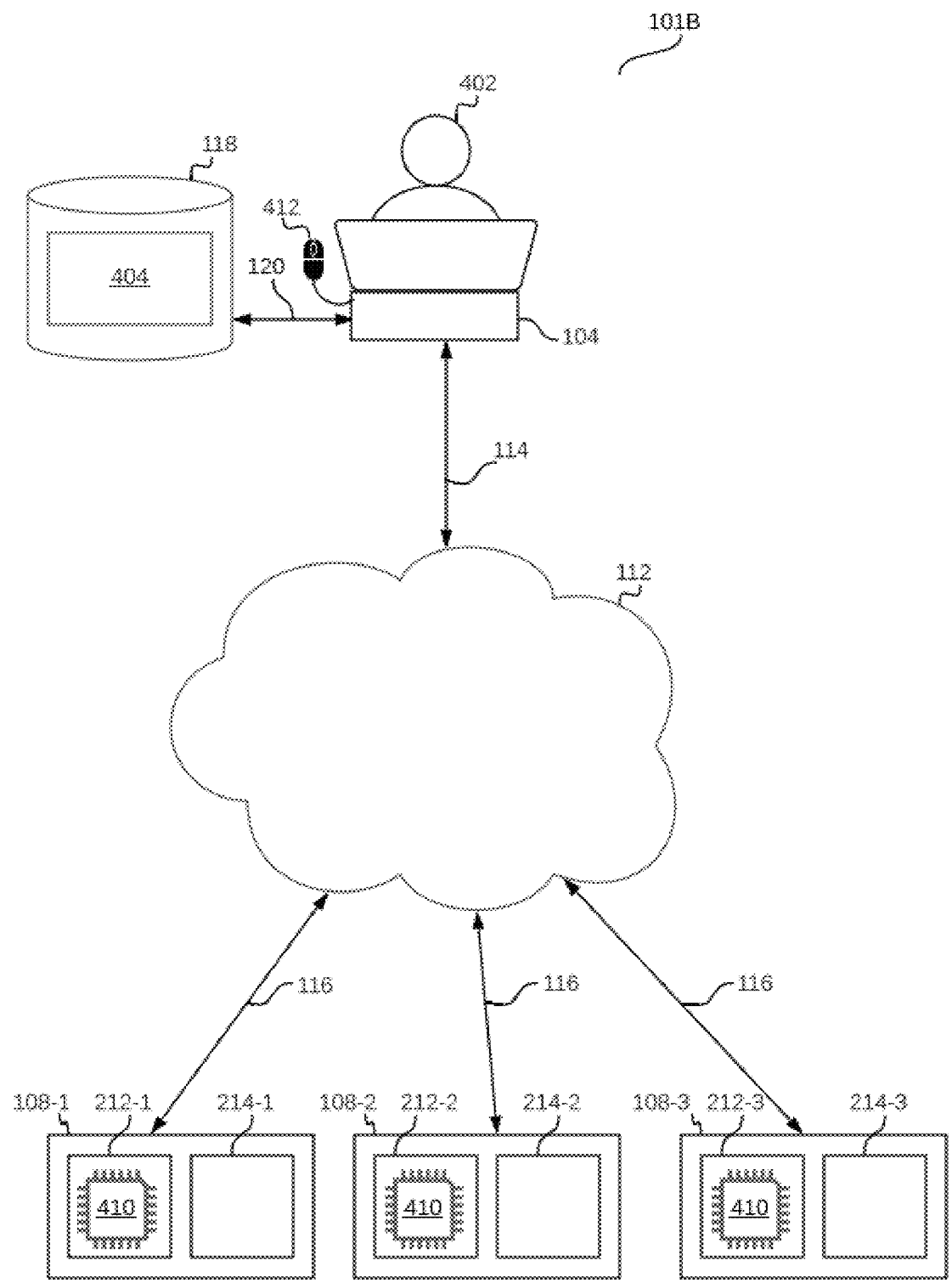
FIG. 4B is a simplified block diagram of another exemplary mobile image surveillance system.

Referring now to FIG. 4B, shown is another block diagram of mobile surveillance system 101B further illustrating operator 402 of mobile surveillance system 101B, input device of client device 104 in the form of a mouse 412, a library 404 of trained models stored in a non-transitory processor-readable storage medium of local server 118, and image capture device 108-1 including non-transitory processor-readable storage mediums 212-1 and 214-1, image capture device 108-2 including non-transitory processor-readable storage mediums 212-2 and 214-2, and image capture device 108-3 including non-transitory processor-readable storage mediums 212-3 and 214-3. Processors and non-transitory processor-readable storage mediums of client device 104 and local server 118 are not illustrated in FIG. 4B to reduce clutter.

Several examples are discussed herein regarding how an operator provides input received by the mobile surveillance systems herein (e.g. FIGS. 5A, 5B, 5C, 6, and 7). Such discussion is fully applicable to operator 402 providing input to mobile surveillance system 101A, to operator 402 providing input to mobile surveillance system 101B, and/or to an operator providing input to any other appropriate mobile surveillance system.

At block 304, process 300 includes receiving an indication of a first geographic area and first period of time. In particular, operator 402 can provide an input to client device 104 indicating the first geographic area and the first period of time, as is discussed below. This input is received by the system. In this disclosure, reference to a system or component performing an action of "receiving" encompasses the system or component performing any appropriate processing, reformatting, decompressing, or other operations related to intaking what is received from the operator for use within the system.

Figure 5A:
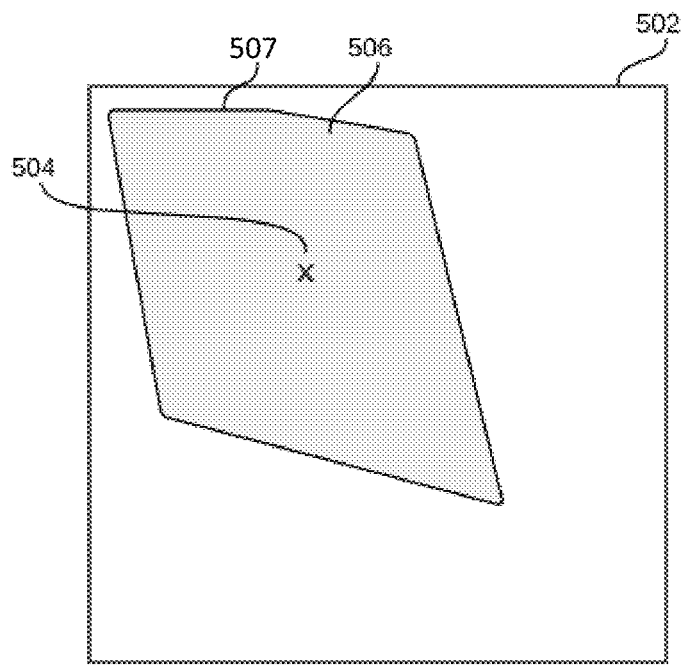
FIG. 5A is a simplified block diagram of an exemplary interactive map.

FIG. 5A illustrates an exemplary user interface by which an operator can input an indication of a geographic area. In the illustrated example, mobile surveillance system 101A or 101B displays an interactive map 502 on a display (not shown) of client device 104, as shown in FIG. 5A. Location 504 indicates the location of the accident in the illustrative example presented above where a red sedan-type vehicle is being searched for (i.e. 1st and 11st street), on interactive map 502. Operator 402 defines a first geographic area 506 by drawing polygon 507 on the interactive map 502, for example, via input device mouse 412 of client device 104. Polygon 507 includes location 504 and surrounding area.

Figure 5B:
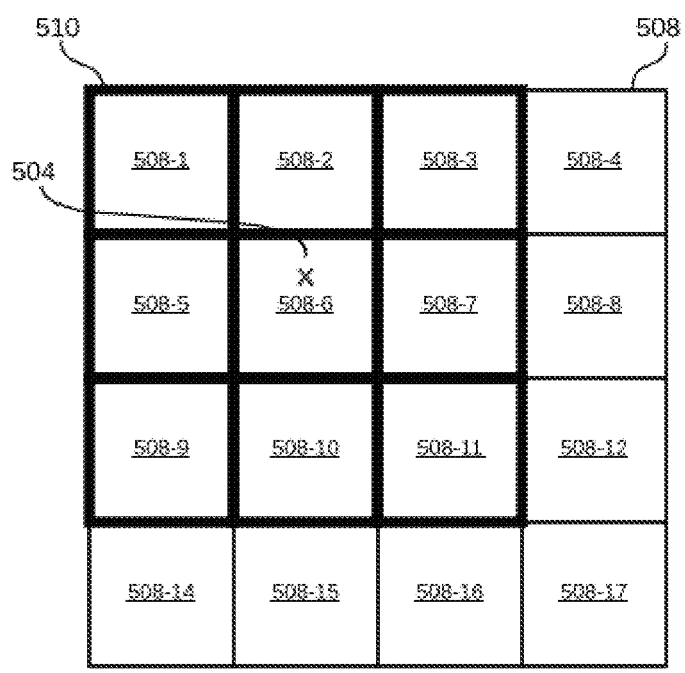
FIG. 5B is a simplified block diagram of another exemplary interactive map.

Alternatively, providing an indication of a first geographic area includes selecting predefined areas on an interactive map. FIG. 5B illustrates another exemplary user interface by which an operator can input an indication of a geographic area. In the illustrated example, mobile surveillance system 101A or 101B displays an interactive map 508 on a display (not shown) of client device 104, as shown in FIG. 5B. Location 504 indicates the location of the accident in the illustrative example presented above (i.e. 1st and 11st street), on interactive map 508, including predefined areas 508-1, 508-2, 508-3, 508-4, 508-5, 508-6, 508-7, 508-8, 508-9, 508-10, 508-11, 508-12, 508-14, 508-15, 508-16, and 508-17. Operator 402 selects predefined area 508-6 within which location 504 is located and predefined areas 508-1, 508-2, 508-3, 508-5, 508-7, 508-9, 508-10, and 508-11 immediately surrounding area 508-6, for defining first geographic area 510.

In some implementations, receiving an indication of a first geographic area at 304 includes receiving one of the following, GPS coordinates, street address, cross streets, community, state, province, country, and cell of a hierarchical geospatial indexing system. For example, operator 402 could input any of these indications of geographic area via a keyboard input device. As another example, with reference to FIG. 5A, the polygon 507 selected by the user can be interpreted by the client device 104 as a bounding box defined by corners or edges. Such corners could correspond to GPS coordinates, addresses, street intersections, or any other appropriate locations. Further, such edges could correspond to streets; geographic features; boundaries of communities, counties, states, provinces, and/or countries; or any other appropriate boundaries.

Figure 5C:
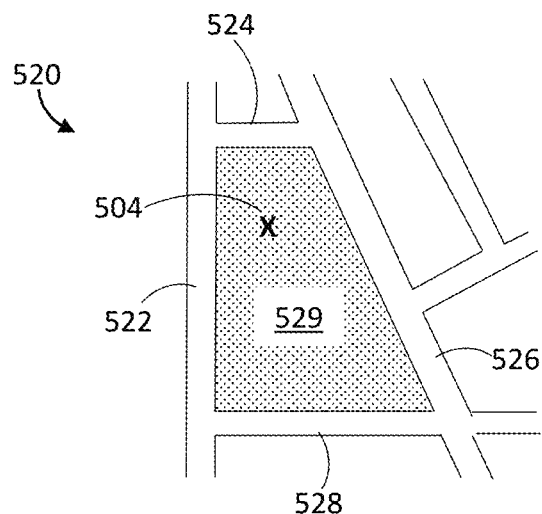
FIG. 5C is a simplified block diagram of yet another exemplary interactive map.

As another example, providing an indication of a first geographic area includes selecting at least a portion of one or more streets on the interactive map. FIG. 5C illustrates yet another exemplary user interface by which an operator can input an indication of a geographic area. In the illustrated example, mobile surveillance system 101A or 101B displays an interactive map 520 on a display (not shown) of client device 104, as shown in FIG. 5C. Location 504 indicates the location of the accident in the illustrative example presented above where a red sedan-type vehicle is being searched for (i.e. 1st and 11st street). Small streets are not shown in FIG. 5C to avoid clutter. Operator 402 selects streets 522, 524, 526, and 528 which surround location 504, and client device 104 receives the indication of the first geographic area as a bounding box defined by streets 522, 524, 526, and 528, which encompasses geographic area 529.

Figure 6:
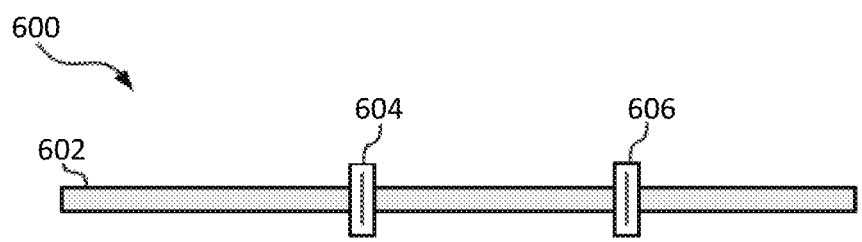
FIG. 6 is a simplified diagram of a time slider.

At block 304 of process 300, operator 402 also provides first time period data indicative of the first period of time to mobile surveillance system 101A or 101B, for example, via a keyboard (not shown) of client device 104. Such provided first time period data defines the first period of time. In the illustrative example, operator 402 inputs Oct. 25, 2021, 7 pm to 7:40 pm. Other means for defining the first period of time are possible. For example, in one implementation, operator 402 provides an indication of the first period of time by manipulating a time slider icon shown in a GUI displayed on a display (not shown) of client device 104. FIG. 6 shows an exemplary user interface of a time slider icon 600 including track 602 and thumbs 604 and 606. Using mouse 412 (or in some implementations another form of input device, such as arrow keys or a touchscreen), operator 402 drags thumbs 604 and 606 to define the first period of time. In the illustrative example above where an accident occurs at 7:20 pm on Oct. 25, 2021, thumb 604 is set to Oct. 25, 2021, 7 pm and thumb 606 is set to is set to Oct. 25, 2021, 7:40 pm. In this way the operator 402 provides input which sets the first period of time as Oct. 25, 2021, 7 pm to 7:40 pm. Other means for defining the first time period are possible.

Figure 7:
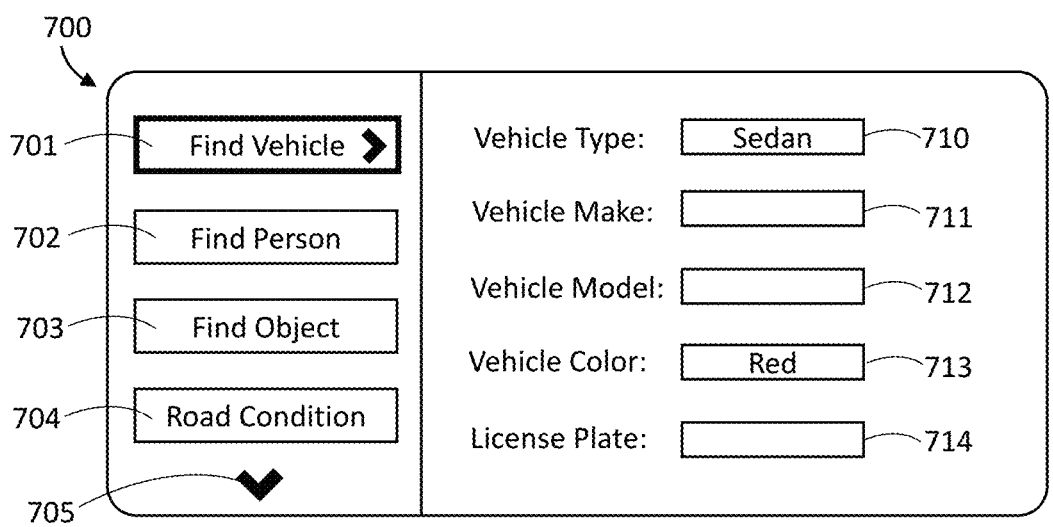
FIG. 7 is a diagram of a user interface for selecting a model.

Returning to process 300 in FIG. 3, at block 306 an indication of a first model of a plurality of models is received. The first model is a model for analyzing image data and detecting a first event. FIG. 7 illustrates an exemplary user interface 700 for selecting a first model. On the left of interface 700 are a plurality of categories of model, including category 701 for vehicle detection models; category 702 for person detection models; category 703 for object detection models; category 704 for road condition models; and arrow 705 indicating that there are more models available for selection. With reference to the illustrative example presented above, a red sedan-type vehicle is being looked for. As such in FIG. 7 operator 402 of client device 104 selects (e.g. via mouse 412 or other input device) category 701 for finding a vehicle. Specific vehicle attributes are shown on the right for refining the vehicle search, including field 710 for vehicle type; field 711 for vehicle make; field 712 for vehicle model; 713 for vehicle color; and 714 for license plate. Other fields could be presented for other vehicle attributes, as appropriate for a given application. In the example of FIG. 7, operator 402 inputs "sedan" as the vehicle type in field 710, and "red" as the vehicle color in field 713. Other attributes of the vehicle are not known, and are left blank. In this way, operator 402 selects a first model trained for detecting a red sedan-type vehicle from library 404 of trained models stored in the non-transitory processor-readable storage medium of local server 118.

In some implementations, trained models are configurable by an operator. For instance, a model performs multi-class classification whereby an object is assigned to one of a plurality of target labels. In this instance, the operator configures the trained model to indicate when an object is assigned to a target label specified by the operator. With reference to the above example of a first model directed to a red sedan-type vehicle, the selection performed by operator 402 in FIG. 7 can select a model trained to identify a vehicle having any possible color, including, black, white, grey, blue, red and green. The model can then identify a vehicle type of the vehicle, such as sedan, truck, van, bus, or any other appropriate vehicle type. Further, the model can then identify any vehicles having a red color. In this way, the first model identifies a red sedan-type vehicle by identifying a vehicle which also is identified as being red, and of a sedan type.

Returning to process 300 in FIG. 3, at block 308, process 300 includes identifying a subset of at least one image capture device of the plurality of image capture devices. The subset of at least one image capture device is limited to image capture devices which capture image data in the first geographic area within the first period of time. The subset of at least one image device may optionally be further limited, as discussed in detail later.

In some implementations, identifying the subset of at least one image capture device includes processing the data pertaining to a plurality of image devices (as received at block 302), to determine whether at least one image capture device corresponds to the first geographic area and first period of time. Throughout this disclosure, reference to an image capture device "corresponding" to a geographic area and a period of time refers to the image capture device capturing image data (or being able to capture image data, such as by being appropriately positioned) in the geographic area within the period of time. In the present discussion, identifying the subset of at least one image capture device includes processing the data pertaining to a plurality of image devices (as received at block 302), to determine whether at least one image capture device captures or captured image data in the first geographic area within the first period of time. If the identified subset of at least one image capture device includes at least one image capture device, process 300 proceeds to block 310, otherwise, if no subset of at least one image capture device is identified, process 300 ends.

In an exemplary implementation with reference to mobile surveillance system 101A in FIGS. 1A and 4A, client device 104 sends a request to cloud server 106 requesting whether any of image capture devices 108 correspond to first geographic area 506 and first period of time. In the presented example where a red sedan-type vehicle is being looked for, this request involves requesting whether any of image capture devices 108 is positioned in the geographic area selected by operator 402 in FIG. 5A, 5B, or 5C, in the period of time of Oct. 25, 2021, 7 pm to 7:40 pm. Upon receipt of the request, cloud server 106 processes image capture device data stored in a non-transitory processor-readable storage medium local to the cloud server. This image capture device data could for example include data pertaining to a plurality of image capture devices as received at block 302. Such data includes location data and time data for each image capture device of the plurality of image capture devices, indicative of geographic location of each respective image capture device over time. In this case, the subset of at least one image capture device is identified as including each image capture device where the respective location data and time data indicate that the respective image capture device was in the first geographic area within the first period of time. In the presented example where a red sedan-type vehicle is being looked for, cloud server 106 determines that image capture devices 108-1, 108-2, and 108-3, correspond to first geographic area 506 and the first period of time. Optionally, cloud server 106 sends a message to client device 104 indicating that image capture devices, 108-1, 108-2, and 108-3, correspond to first geographic area 506 and the first period of time. Process 300 proceeds to block 310.

In another exemplary implementation with reference to mobile surveillance system 101A in FIGS. 1A and 4A, or mobile surveillance system 101B in FIGS. 1B and 4B, client device 104 (optionally via cloud server 106) transmits request data indicative of the first geographic area and the first period of time to each image capture device of the plurality of image capture devices 108. The request data is transmitted to request whether the image capture device has image data stored in a non-transitory processor-readable storage medium thereof, corresponding to first geographic area 506 and the first period of time. Each image capture device in the plurality of image capture devices determines (e.g. by at least one processor therein) whether historical image data stored in the at least one non-transitory processor-readable storage medium of the respective image device was captured in the first geographic area within the first time period. If an image capture device has image data stored in a non-transitory processor-readable storage medium thereof captured in the first geographic area 506 within the first period of time, the image capture device transmits an indication of this to client device 104, and process 300 proceeds to block 310. An image capture device which does not have image data stored in a non-transitory processor-readable storage medium thereof captured in the first geographic area 506 within the first period of time can transmit an indication of this to client device 104, or may transmit nothing. Each image capture device from which an indication is received indicating that the respective image capture device has image data stored in a non-transitory processor-readable storage medium thereof captured in the first geographic area 506 within the first period of time is identified as part of the subset of image capture devices in block 308. Each image capture device from which an indication is received indicating that the respective image capture device does NOT have image data stored in a non-transitory processor-readable storage medium thereof captured in the first geographic area 506 within the first period of time, or each image capture device from which no indication is received, is NOT included in the subset of at least one image capture device in block 308. In the presented example where a red sedan-type vehicle is being looked for, the request involves requesting whether any of image capture devices 108 is positioned in the geographic area selected by operator 402 in FIG. 5A, 5B, or 5C, in the period of time of Oct. 25, 2021, 7 pm to 7:40 pm. In reply to the request from client device 104, image capture devices 108-1, 108-2 and 108-3 transmit a response to client device 104 indicating captured image data corresponding to the first geographic area and first period of time, and process 300 proceeds to block 310.

In yet another exemplary implementation with reference to mobile surveillance system 101A in FIGS. 1A and 4A, or mobile surveillance system 101B in FIGS. 1B and 4B, client device 104 accesses data pertaining to a plurality of image captured devices (e.g. as received at block 302). This data pertaining to a plurality of image captured devices can be stored locally at a non-transitory processor-readable storage medium of client device 104, or at a non-transitory processor readable storage medium of local server 118. This image capture device data could for example include data pertaining to a plurality of image capture devices as received at block 302. Such data includes location data and time data for each image capture device of the plurality of image capture devices, indicative of geographic location of each respective image capture device over time. In this case, the subset of at least one image capture device is identified as including each image capture device where the respective location data and time data indicate that the respective image capture device was in the first geographic area within the first period of time. If no image capture devices are identified as corresponding to first geographic area 506 and the first period of time, process 300 ends. If at least one image capture device is identified as corresponding to first geographic area 506 and the first period of time, process 300 proceeds to block 310. In the presented example where a red sedan-type vehicle is being looked for, this involves determining whether any of image capture devices 108 is positioned in the geographic area selected by operator 402 in FIG. 5A, 5B, or 5C, in the period of time of Oct. 25, 2021, 7 PM to 7:40 PM. In this example scenario, client device 104 determines that image capture devices 108-1, 108-2, and 108-3, correspond to first geographic area 506 and the first period of time. Process 300 proceeds to block 310.

To summarize, act 308 can be performed at client device 104, based on data stored at the client device 104 or at local server 118; act 308 can be performed at cloud device 106, based on data stored at the cloud device 106; act 308 can be performed at client device 104 based on data received from cloud device 106; or act 308 can be performed at either the client device 104 or cloud device 106 based on data received from image capture devices 108.

At block 310, process 300 includes transmitting first model data to each image capture device in the subset of image capture devices identified at block 308. The first model data includes the first model for detecting the first event, as indicated at block 306. In some implementations (e.g. FIGS. 1B and 4B), the first model data is transmitted from client device 104 to each image capture device in the subset of at least one image capture device. In other implementations (e.g. FIGS. 1A and 4A), the first model data is transmitted from client device 104 to each image capture device in the subset of at least one image capture device, via cloud server 106. In yet other implementations (e.g. FIGS. 1A and 4A), the first model data is transmitted from cloud server 106 to each image capture device in the subset of at least one image capture device.

Collection of acts 320 in process 300 includes acts which are performed at each image capture device in the subset of image capture devices, and includes acts 322, 324, 326, and optionally 328.

At 322, each image capture device (or devices peripheral thereto as discussed with reference to FIG. 2B) to which the first model data is transmitted at block 310 receive the first model data, and store the first model data in at least one non-transitory processor readable storage medium at the image capture device or peripheral device. In the presented example where a red sedan-type vehicle is being searched for, image capture devices 108-1, 108-2, and 108-3 are identified in the subset of at least one image capture device, these image capture devices 108-1, 108-2, and 108-3 receive the first model data 410 and store the same in respective non-transitory processor-readable storage mediums 212-1, 212-2, and 212-3 as shown in FIGS. 4A and 4B.

At 324, any instances of the first event are identified at each respective image capture device of the subset of image capture devices (e.g. by a respective processor thereon). This is performed by processing image data stored in a non-transitory processor-readable storage medium of the respective image capture device according to the first model. That is, the first model is run on image data stored at each image capture device in the subset of image capture devices. What is meant by an "instance" of the first event is that a representation of the first event is identified in the image data (e.g. image data showing an object which is being searched for, or image data showing a particular condition or status which is being searched for).

Optionally, time period data indicative of the first time period is transmitted from client device 104 or cloud server 106 to each image capture device in the subset of image capture devices. In such a case, block 324 for each image capture device of the plurality of image capture devices can be limited to being performed for select image data captured within the first time period. That is, the first model is run on image data captured within the first time period, as stored at each image capture device in the subset of image capture devices.

Optionally, geographic data indicative of the first geographic area is transmitted from client device 104 or cloud server 106 to each image capture device in the subset of image capture devices. In such a case, block 324 for each image capture device of the plurality of image capture devices can be limited to being performed for select image data captured in the first geographic area. That is, the first model is run on image data captured in the first geographic area, as stored at each image capture device in the subset of image capture devices.

Limiting block 324 to being performed on image data captured within the first period of time and/or within the first geographic area is optional in the sense that both of these limitations are not required, or size limitations of storage at image capture devices may already sufficiently limit processing. For example, a non-transitory processor-readable storage medium at or peripheral to an image capture device may only store a small number of hours of image data (e.g. 1 hour, 2 hours, etc., though larger storage options are possible). As a result, the image data stored at an image capture device may already be limited to be close to the length of the first period of time anyway. Further, limiting processing of image data to both the first geographic area and the first time period is also not required (though is possible). For example, by limiting processing to image data captured within the first time period, this may already significantly limit the amount of image data to be processed to be around the first geographic area anyway. Similarly, by limiting processing to image data captured in the first geographic area, this may already significantly limit the amount of image data to be processed to be around the first period of time anyway.

If an instance of the first event is detected at block 324, the respective image capture device where the instance was detected transmits a notification at block 326, to be received by cloud server 106 or client device 104. A respective image capture device may transmit a single notification for each identified instance of the first event, or may transmit a cumulative notification for all identified instances of the first event.

In the presented example where a red sedan-type vehicle is being looked for, processing of image data corresponding to the first time period, Oct. 25, 2021, 7 pm to 7:40 pm, begins on each of image capture device 108-1, 108-2 and 108-3. A red sedan-type vehicle is detected by the first model in image data stored in non-transitory processor-readable storage medium 214-1 of image capture device 108-1. At block 326, image capture device 108-1 (or a peripheral device communicatively coupled thereto) transmits notification data to client device 104 via cloud server 106. In this example, notification data includes information indicating the location and time the red sedan-type vehicle was detected as well as a portion of video data including the red sedan-type vehicle.

In some instances, an image capture device may no longer have image data corresponding to the first period of time stored in a local non-transitory processor-readable storage medium thereof. For example, non-transitory processor-readable storage medium 214-3 of image capture device 108-3, for storing recorded image data, is only large enough to store the most recent 6 hours of recorded image data. As such, the first time period, Oct. 25, 2021, 7 pm to 7:40 pm, occurred more than 6 hours before. In this instance, image capture device 108-3 sends a message to cloud server 106 indicating that video data corresponding to the first period of time is not available for processing. Alternatively, image capture device 108-3 could send no notification or message indicating that video data corresponding to the first time period is not available for processing, and the client device 104 or cloud server 106 which is aggregating identified instances of the first event may assume that no instance of the first event were identified by image capture device 108-3.

At block 328, use of the first model stored at each respective image capture device of the subset of image capture devices is ceased. Several examples are discussed below.

In an example, as mentioned earlier, an image capture device (or a peripheral device communicatively coupled to an image capture device) may have limited storage capabilities, such that it is not feasible or practical to store several different detection models on a non-transitory processor-readable storage medium thereof. In such a case, at block 328 the first model stored at the image capture device is removed from the non-transitory processor-readable storage medium at the image capture device. In this context "removed" can refer to the first model being actively deleted from the non-transitory processor-readable storage medium at the image capture device, such as by overwriting the first model data with other data (e.g. dummy data). "Removed" can also refer to the first model data being de-indexed, such that while the first model data is technically still present on the non-transitory processor-readable storage medium of the image capture device, the first model data can be overwritten as needed by new data at an appropriate time. "Removed" can also refer to the first model data being marked for removal, such as flagging the first model data as being acceptable to overwrite as appropriate, but maintaining accessibility of the first model data in the event it is desirable to access in the future.

In another example, as mentioned earlier, an image capture device (or a peripheral device communicatively coupled to an image capture device) may have limited processing capabilities, such that it is not feasible or practical to run processing according to several different models concurrently. In such an example, at block 328 processing according to the first model is ceased, to free up processing resources for use in analysis based on another model. The first model data may still be stored at the non-transitory processor-readable storage medium at the image capture device for future use, if needed.

In another example, maintenance of processing models can consume excessive communication bandwidth. That is, sending updates for a model to a plurality of image capture devices (or peripheral devices communicatively coupled to respective image capture devices) can consume a lot of bandwidth, especially if several models are stored at each image capture device. In such an example, the first model data can be preserved on the non-transitory processor-readable storage medium of the image capture device, but not actively updated or maintained to save bandwidth. Should the first model be called to use again, updates to the first model data can be sent at block 310 as appropriate.

The above examples are not necessarily exclusive to each other. In an exemplary implementation, processing of image data stored in non-transitory processor-readable storage medium 214 by the first model is stopped and first model data 410 is removed from non-transitory processor-readable storage medium 212. Memory space in non-transitory processor-readable storage medium 212 once occupied by first model data 410 is now made available for storage of a second model. Similarly, the processing power of processing resource 206 required to process image data by the first model is now available for processing image data by a second model.

After receiving at block 326 the at least one notification indicative of the identified at least one instance of the first event at client device 104, including image data of the identified at least one instance of the first event, operator 402 views the image data received to acquire more information about the red sedan-type vehicle, such as make and model and/or license plate number, and/or an image of the driver, to identify the driver of the vehicle.

In some implementations, the subset of at least one image capture device identified at block 308 is further limited in addition to image capture devices which capture image data in the first geographic area within the first period of time. In an exemplary implementation, the subset of image capture devices is further limited to image capture devices at vehicles of certain vocation. In this context, vehicle "vocation" refers to how a vehicle is used and/or what role a vehicle serves. For example, "police cruiser" may be one vocation, which encompasses vehicles which a police force uses to transport officers and perform law enforcement. As another example, "passenger bus" may be another vocation which encompasses vehicles used to transport general civilians. As yet another example, "service vehicles" may be another vocation which encompasses vehicles used to construct, service, or maintain infrastructure. These specific vocations are merely illustrative examples, and other examples of vocation are possible. Further, vehicle vocation may also specify an organization for which the vocation is conducted.

In some implementations, process 300 further comprises receiving (e.g. by client device 104 or cloud server 106) an indication of a first vehicle vocation. In some scenarios, at block 308, the identified subset of at least one image capture device is further limited to image capture devices which are included in vehicles of the first vocation. In other scenarios, at block 308, the identified subset of at least one image capture device is further limited to image capture devices which are included in vehicles of different vocation than the first vocation.

In an exemplary implementation, the plurality of image capture devices 108 are mounted on vehicles 110 including public transportation vehicles, (e.g., buses, trains), service vehicles, other municipally owned and operated vehicles, and police cruisers from a plurality of police enforcement agencies, including police enforcement agencies from two different municipalities.

In one exemplary scenario, image capture devices 108 (or peripheral devices communicatively coupled thereto) mounted on police cruisers associated with a first municipality are currently processing video data for detecting instances of a second event associated with a second geographic area and second period of time (e.g., a different iteration of process 300 is executed). As such, to avoid interruption of the ongoing processing by image capture devices 108 mounted on police cruisers associated with a first municipality (i.e. vehicles of a first vocation), the subset of at least one image capture device is limited to exclude image capture devices in vehicles of the first vocation. That is, the subset of at least one image capture device is further limited to image capture devices which are included in vehicles of different vocation than the first vocation. In the presented example of detecting the red sedan-type vehicle, block 308 of process 300 entails identifying any of the plurality of image capture devices 108 mounted to vehicles 110 including public transportation vehicles, municipally owned and operated vehicles and police cruisers from the second police enforcement agency only (not the first police enforcement agency), which capture image data in the first geographic area 506 within the first period of time, Oct. 25, 2021, 7 pm to 7:40 pm.

In another exemplary scenario, image capture devices 108 (or peripheral devices communicatively coupled thereto) mounted on police cruisers are generally reserved for detecting instances of events associated with dangerous situations, criminal activity, or missing persons. As such, for events unrelated to dangerous situations, criminal activity, or missing persons, the subset of at least one image capture device is limited to image capture devices at vehicles of a first vocation (where the first vocation is selected as a vocation which is different from police or law enforcement). That is, the subset of at least one image capture device is further limited to image capture devices which are included in vehicles of the first vocation. In an example where detection of faulty infrastructure is desired, services vehicles is selected as the first vocation, and block 308 of process 300 entails identifying any of the plurality of image capture devices 108 mounted to service vehicles 110, which capture image data in the first geographic area within the first period of time.

Limiting the subset of at least one image capture device based on vehicle vocation can be performed in a plurality of different ways. In some implementations, an operator 402 is knowledgeable as to what vocations of vehicle should be used for a given detection. In an example, operator 402 selects all image capture devices 108, other than image capture devices mounted to police cruisers associated with the first municipality (which are known to be busy), for detecting the red sedan-type vehicle involved in the accident, in the above presented example. In other implementations, detection of vehicle vocations which are already performing a detection is automatically performed (e.g. by client device 104 or cloud server 106). For example, model data is already sent to a subset of image captures device in accordance with block 310 of process 300, and notifications of identification of instances of an event (or notifications of failure to detect instances of the event) have not yet been received by the client device 104 or cloud server 106. Based on this, the processing is assumed to still be running, and image capture devices in vehicles involved in this detection are excluded from a subsequently identified subset of at least one image capture devices (in another instance or iteration of process 300).

In yet other implementations, running of models can be triaged according to a priority assigned to a given detection or performing of process 300. For example, detection of a missing person may be assigned a high priority, whereas detection of infrastructure irregularities (e.g. potholes) may be assigned a relatively lower priority. Such assigning of priority could be performed by operator 402 at block 306 when providing an indication of a first model, or could be performed automatically by client device 104 or could server 106 based on the nature of the first model selected by the operator 402. For vehicles having an image capture device which is already performing processing according to a model, an assigned priority of the processing being performed is compared to a priority of processing for which a subset of image capture device is being identified at block 308. Image capture devices involved in a higher priority processing (compared to a lower priority processing for which a subset of image capture devices is being identified at 308) are excluded from a subsequently identified subset of at least one image capture device for the lower priority processing. Conversely, for image capture devices involved in a lower priority processing (compared to a higher priority processing for which a subset of image capture devices is being identified at 308), use of a model for the lower priority processing is ceased, and the image capture devices are included in the identified subset of at least one image capture devices for the higher priority processing.

Process 800

Figure 8:
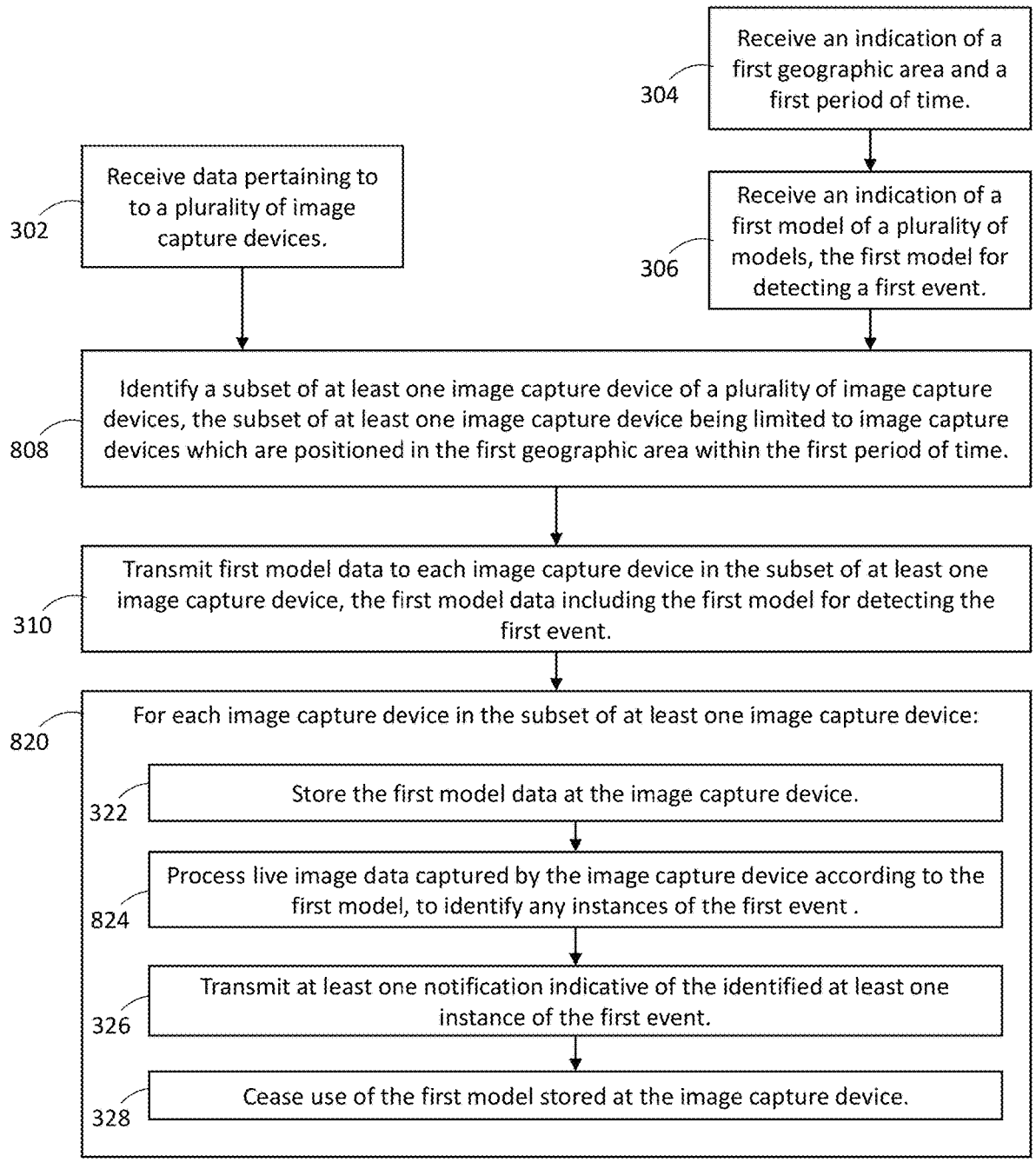
FIG. 8 is a flowchart of another exemplary method for detecting events.

According to another exemplary implementation, there is a process for detecting a future event from live image data captured by an image capture device. Shown in FIG. 8 is a flow diagram of exemplary process 800 for detecting a future event. Process 800 is described below as being carried out by mobile image surveillance system 101A in FIG. 1A. Alternatively, process 800 may be carried out by mobile image surveillance system 101B in FIG. 1B, another system, a combination of systems subsystems, devices or other suitable means provided the operations described herein are performed. Process 800 may be automated, semi-automated and some blocks thereof may be manually performed. Process 800 as illustrated includes acts 302, 304, 306, 808, 310, 322, 824, 326, and 328. Acts 322, 824, 326, and 328 are grouped together in collection of acts 820, performed by each image capture device in an identified subset of at least one image capture device. One skilled in the art will appreciate that additional acts could be added, acts could be removed, or acts could be reordered as appropriate for a given application. With reference to the examples illustrated in FIGS. 1A and 1B, acts can be performed by appropriate components of mobile surveillance systems 101A or 101B. Further, any of the at least one non-transitory processor-readable storage mediums could have processor-executable instructions stored thereon, which when executed by a respective at least one processor cause a respective device to perform a given act of process 800.

Process 800 in FIG. 8 is similar to process 300 in FIG. 3, and description of process 300 is applicable to process 800 unless context dictates otherwise. In particular, several acts of process 800 are labelled with the same reference numerals as similar acts in process 300. Description of acts of process 300 applies to acts of process 800 with the same reference numerals.

An exemplary user of mobile image surveillance system 101A is a police enforcement agency. The police enforcement agency utilizes mobile image surveillance system 101A or 101B for detecting events. In this illustrative example, image capture devices 108 are mounted in vehicles 110 including police cruisers, public transportation vehicles, (e.g., buses, trains) and other municipally owned and operated vehicles. Process 800 is applicable to other use cases and other uses beyond law enforcement.

Process 800 begins at block 302 wherein block 302 includes receiving and storing data pertaining to a plurality of image capture devices. Description of block 302 in process 300 is fully applicable to block 302 in process 800, and is not repeated for brevity.

In an illustrative example, the police enforcement agency issues a Silver Alert to find a person who was recently reported missing by their caregiver. A Silver Alert may be issued when an elderly, developmentally, or cognitively impaired person has gone missing and is determined to be at-risk. Silver Alerts provide immediate information to the public to aid in the swift recovery of at-risk persons meeting the criteria. In this example, the missing person has taken a vehicle with license plate number ABC123. The police enforcement agency immediately utilizes mobile image surveillance system 101A or 101B to locate the missing person as quickly as possible.

Referring again to FIG. 4A and FIG. 4B, mobile surveillance systems 101A and 101B can receive input from operator 402, e.g. via input device of client device 104 in the form of a mouse 412. As discussed earlier, FIGS. 4A and 4B also show a library 404 of trained models stored in a non-transitory processor-readable storage medium of local server 118, and image capture device 108-1 including non-transitory processor-readable storage mediums 212-1 and 214-1, image capture device 108-2 including non-transitory processor-readable storage mediums 212-2 and 214-2, and image capture device 108-3 including non-transitory processor-readable storage mediums 212-3 and 214-3.

Next, at block 304, process 800 includes receiving an indication of the first geographic area and period of time. Description of block 304 in process 300 is fully applicable to block 304 in process 800. In particular, several examples are discussed with reference to FIGS. 5A, 5B, 5C, 6, and 7 regarding how an operator provides input received by the mobile surveillance systems herein.

In the example of FIG. 5A, mobile surveillance system 101A or 101B displays an interactive map 502 on a display (not shown) of client device 104. Location 504 indicates the location of the home of the missing person in the illustrative example presented above, 456 Water Street, on interactive map 502. Operator 402 defines a first geographic area 506 by drawing polygon 507 on the interactive map 502, for example, via input device mouse 412 of client device 104. Polygon 507 includes location 504 and surrounding area.

Alternatively, providing an indication of a first geographic area includes selecting predefined areas on an interactive map. FIG. 5B illustrates another exemplary user interface by which an operator can input an indication of a geographic area. In the illustrated example, mobile surveillance system 101A or 101B displays an interactive map 508 on a display (not shown) of client device 104, as shown in FIG. 5B. Location 504 indicates the location of the home of the missing person, 456 Water Street, on interactive map 508, including predefined areas 508-1, 508-2, 508-3, 508-4, 508-5, 508-6, 508-7, 508-8, 508-9, 508-10, 508-11, 508-12, 508-14, 508-15, 508-16, and 508-17. Operator 402 selects predefined area 508-6 within which location 504 is located and predefined areas 508-1, 508-2, 508-3, 508-5, 508-7, 508-9, 508-10, and 508-11 immediately surrounding area 508-6, for defining first geographic area 510.

In some implementations, receiving an indication of a first geographic area at 304 includes receiving one of the following, GPS coordinates, street address, cross streets community, state, province, country, and cell of a hierarchical geospatial indexing system. Examples of how each of these indications of geographic area can be input is described earlier in the discussion of process 300 and FIGS. 5A and 5B, and is not repeated for brevity.

As another example, providing an indication of a first geographic area includes selecting at least a portion of one or more streets on the interactive map. As discussed earlier, FIG. 5C illustrates yet another exemplary user interface by which an operator can input an indication of a geographic area. In the illustrated example, mobile surveillance system 101A or 101B displays an interactive map 520 on a display (not shown) of client device 104, as shown in FIG. 5C. Location 504 indicates the location of the missing person's home in the illustrative example presented above (i.e. 456 Water street). Small streets are not shown in FIG. 5C to avoid clutter. Operator 402 selects streets 522, 524, 526, and 528 which surround location 504, and client device 104 receives the indication of the first geographic area as a bounding box defined by streets 522, 524, 526, and 528.

At block 304 of process 800, operator 402 also provides first time period data indicative of the first period of time to mobile surveillance system 101A or 101B, for example, via a keyboard (not shown) of client device 104. Time period data defines the first period of time as a time in the future. In the illustrative example, today's date is referenced as Oct. 26, 2021, and the first period of time is input by operator 402 at 11 AM today (e.g. immediately or "now") to 6 PM the same day. Other means for defining the first time period are possible.

For example, in one implementation, operator 402 provides an indication of the first period of time by manipulating a time slider icon shown in a GUI displayed on a display (not shown) of client device 104. FIG. 6 shows an exemplary user interface of a time slider icon 600 including track 602 and thumbs 604 and 606. Using mouse 412 (or in some implementations another form of input device, such as arrow keys or a touchscreen), operator 402 drags thumbs 604 and 606 to define the first time period. In the illustrative example above where the person is missing now until an unforeseen time in the future, thumb 604 is set to Oct. 26, 2021, 11 AM (the present time or "now") and thumb 606 is set to is set to Oct. 26, 2021, 6 PM (a time in the future, though other appropriate future times could be selected as appropriate). In this way the operator 402 provides input which sets the first time period as Oct. 26, 2021, 11 AM to 6 PM. Other means for defining the first time period are possible.

Returning to process 800 in FIG. 8, at block 306 an indication of a first model of a plurality of models is received. Description of block 306 in process 300 is fully applicable to block 306 in process 800. As discussed earlier, the first model is a model for analyzing image data and detecting a first event. FIG. 7 illustrates an exemplary user interface 700 for selecting a first model, and discussion of FIG. 7 above is fully applicable in the context of block 306 in process 800 of FIG. 8 unless context requires otherwise, and this discussion is not repeated for brevity. In the illustrative example presented for process 800, although a missing person is being searched for, the available information indicates the license plate of the vehicle taken by the missing person is ABC123, and finding this vehicle may assist in finding the missing person. As such, operator 402 can select category 701 for finding a vehicle. In the fields on the right of user interface 700, operator can input the license plate number of ABC123 into field 714 (and not fill fields 710 and 713 with "red" and "sedan", respectively, unless these entries are appropriate). In this way, operator 402 selects a first model trained for detecting a license plate number (ABC123) from library 404 of trained models stored in the non-transitory processor-readable storage medium of local server 118.

Similar to as discussed earlier with reference to process 300, in some implementations, trained models are configurable by an operator. For instance, a model performs multi-class classification whereby an object is assigned to one of a plurality of target labels. Such description is fully applicable to process 800, and is not repeated for brevity.

Returning to process 800, at block 808, process 800 includes identifying a subset of at least one image capture device of the plurality of image capture devices. Block 808 in process 800 is similar to block 308 in process 300, and description of block 308 is applicable to block 808 unless context requires otherwise. In block 808, the subset of at least one image capture device is limited to image capture devices which are positioned in the first geographic area within the first period of time (or will be positioned in the first geographic area at the first period of time). The subset of at least one image device may optionally be further limited, as discussed in detail later.

In some implementations, identifying the subset of at least one image capture device includes processing the data pertaining to a plurality of image devices (as received at block 302), to determine whether at least one image capture device corresponds to the first geographic area and first period of time. As mentioned above, throughout this disclosure, reference to an image capture device "corresponding" to a geographic area and a period of time refers to the image capture device capturing (or being able to capture) image data in the geographic area within the period of time. In the present discussion, identifying the subset of at least one image capture device includes processing the data pertaining to a plurality of image devices (as received at block 302), to determine whether at least one image capture device is or will be positioned in the first geographic area within the first period of time (i.e. the image capture device is presently able to capture image data of the first geographic area, or will be able to capture image data of the first geographic area in the future). A future position of any given image capture device could be received from a route planning system or software. As one example, buses typically follow a known and predictable route. Bus route information can be received with the data pertaining to the image capture device at block 302, such that a future position of buses (and image capture devices positioned at said buses) can be analyzed to determine whether a given bus will be positioned in the first geographic area within the first period of time.

If the identified subset of at least one image capture device includes at least one image capture device, process 800 proceeds to block 310. If no subset of at least one image capture device is identified at 808, process 800 can end. In some implementations, acts of process 800 are repeated throughout the first period of time. For example, block 808 can be performed regularly throughout the first period of time (even if no subset of at least one image capture device is initially identified at 808), such that new image sensors which enter the first geographic area during the first period of time can be identified and included in the subset of at least one image capture device.

In an exemplary implementation with reference to mobile surveillance system 101A in FIGS. 1A and 4A, client device 104 sends a request to cloud server 106 requesting whether any of image capture devices 108 are positioned in first geographic area 506 within the first period of time. In the presented example where a missing person is being looked for, this request involves requesting whether any of image capture devices 108 is (or will be) positioned in the geographic area selected by operator 402 in FIG. 5A, 5B, or 5C, in the period of time of Oct. 26, 2021, (today) 11 AM (now) until 6 PM. Upon receipt of the request, cloud server 106 processes image capture device data stored in a non-transitory processor-readable storage medium local to the cloud server for the duration of the first period of time. This image capture device data could for example include data pertaining to a plurality of image capture devices as received at block 302. Such data includes location data and time data for each image capture device of the plurality of image capture devices (including possible future data), indicative of geographic location of each respective image capture device over time. In this case, the subset of at least one image capture device is identified as including each image capture device where the respective location data and time data indicate that the respective image capture device is or will be positioned in the first geographic area within the first period of time. In the presented example where a missing person is being looked for, cloud server 106 determines that image capture devices 108-1, 108-2 and 108-3 enter first geographic area 506 during the first period of time. Optionally, could server 106 transmits a message to client device 104 indicating this. For the duration of the first time period, cloud server 106 processes image capture device data when received and stops processing image capture device data when the first time period expires. In the present example, cloud server 106 processes received image capture device data until 6 PM. Process 800 proceeds to block 310.

In another exemplary implementation with reference to mobile surveillance system 101A in FIGS. 1A and 4A, or mobile surveillance system 101B in FIGS. 1B and 4B, client device 104 (optionally via could server 106) transmits request data indicative of the first geographic area and the first period of time to each image capture device of the plurality of image capture devices 108. The request data is transmitted to request whether the image capture device is positioned in the first geographic area 506 during the first period of time. Each image capture device which is (or will be) positioned in the first geographic area within the first time period transmits a response to client device 104 and/or cloud server 106 indicating the same, and process 800 proceeds to block 310. Each image capture device which is not (or will not be) positioned in the first geographic area within the first time period can transmit a response to client device 104 and/or cloud server 106 indicating this, or may transmit nothing. Each image capture device from which an indication is received indicating that the respective image capture device is (or will be) positioned in the first geographic area 506 within the first period of time is identified as part of the subset of image capture devices in block 808. Each image capture device from which an indication is received indicating that the respective image capture device is not (or will not be) positioned in the first geographic area 506 within the first period of time, or each image capture device from which no indication is received, is NOT included in the subset of at least one image capture device in block 808. In the presented example where a missing person is being looked for, the request involves requesting whether any of image capture devices 108 is (or will be) positioned in the geographic area selected by operator 402 in FIG. 5A, 5B, or 5C, in the period of time of Oct. 26, 2021, 11 AM to 6 PM. In reply to the request from client device 104, image capture devices 108-1, 108-2 and 108-3 transmit a response to client device 104 indicating that they are positioned in the first geographic area within first time period, and process 800 proceeds to block 310. This can be performed for the duration of the first period of time, to identify new image capture devices which enter the first geographic area.

In yet another exemplary implementation with reference to mobile surveillance system 101A in FIGS. 1A and 4A, or mobile surveillance system 101B in FIGS. 1B and 4B, client device 104 accesses data pertaining to a plurality of image capture devices (e.g. as received at block 302). This data pertaining to a plurality of image captured devices can be stored locally at a non-transitory processor-readable storage medium of client device 104, or at a non-transitory processor readable storage medium of local server 118. This image capture device data could for example include data pertaining to a plurality of image capture devices as received at block 302. Such data includes location data and time data for each image capture device of the plurality of image capture devices (possibly including future data), indicative of geographic location of each respective image capture device over time. In this case, the subset of at least one image capture device is identified as including each image capture device where the respective location data and time data indicate that the respective image capture device is or will be positioned in the first geographic area within the first period of time. If at least one image capture device is identified as being positioned in the first geographic area 506 within the first period of time, process 300 proceeds to block 310. If no image capture devices are identified as being positioned in the first geographic area 506 within the first period of time, process 300 can end. Optionally, this can be repeated for the duration of the first period of time, to identify any new image capture devices which enter the first geographic area within the first period of time. In the presented example where a missing person is being looked for, a determination is made as to whether any of image capture devices 108 is or will be positioned in the geographic area selected by operator 402 in FIG. 5A, 5B, or 5C, in the period of time of Oct. 25, 2021, 11 AM to 6 PM. In this example scenario, client device 104 determines that image capture devices 108-1, 108-2, and 108-3, are positioned in first geographic area 506 within the first period of time. Process 800 proceeds to block 310.

At block 310, process 800 includes transmitting first model data to each image capture device in the subset of image capture devices identified at block 808. The first model data includes the first model for detecting the first event, as indicated at block 306. Description of block 310 with reference to process 300 is fully applicable to block 310 in process 800, and is not repeated for brevity.

Collection of acts 820 in process 800 includes acts which are performed at each image capture device in the subset of image capture devices, and includes acts 322, 824, 326, and optionally 328.

At 322, each image capture device (or devices peripheral thereto as discussed with reference to FIG. 2B) to which the first model data is transmitted at block 310 receive the first model data, and store the first model data in at least one non-transitory processor readable storage medium at the image capture device or peripheral device. Description of block 322 in process 300 is fully applicable to block 322 in process 800. In the presented example where a missing person is being searched for, image capture devices 108-1, 108-2, and 108-3 are identified in the subset of at least one image capture device, and these image capture devices 108-1, 108-2, and 108-3 receive the first model data 410 and store the same in respective non-transitory processor-readable storage mediums 212 as shown in FIGS. 4A and 4B.

At 824, instances of the first event are identified at each image capture device of the subset of image capture devices (e.g. by a respective processor thereon). This is performed by processing, by at least one processor of each respective image capture device in the subset of image capture devices, live image data captured during the first period of time, according to the first model. As discussed earlier, what is meant by an "instance" of the first event is that a representation of the first event is identified in the image data (e.g. image data showing an object which is being searched for, or image data showing a particular condition or status which is being searched for).

If an instance of the first event is detected at block 824, the respective image capture device where the instance is detected transmits a notification at block 326, to be received by cloud server 106 or client device 104. A respective image capture device may transmit a single notification for each identified instance of the first event, or may transmit a cumulative notification for a plurality of identified instances of the first event.

Once the first period of time expires, or once an image capture device leaves the first geographic region, process 800 proceeds to block 328. To this end, time period data indicative of the first time period can be transmitted from client device 104 or cloud server 106 to each image capture device in the subset of image capture devices, and/or geographic data indicative of the first geographic area can be transmitted from client device 104 or cloud server 106 to each image capture device in the subset of image capture devices.

In the presented example where a missing person is being searched for, live image data captured during the first period of time, Oct. 26, 2021, (today) 11 AM (now) until 6 PM, is processed according to the first model on image capture devices 108-1, 108-2 and 108-3. A vehicle having a license plate number ABC123 is detected by the first model executed by image capture device 108-1. At block 326, image capture device 108-1 transmits notification data to client device 104 via cloud server 106. In this example, notification data includes information indicating the location and time the vehicle was detected. Upon expiration of the first period of time, process 800 proceeds to block 328.

At block 328 in process 800, use of the first model stored at each respective image capture device of the subset of image capture devices is ceased. This includes terminating processing live image data according to the first model. Several examples are discussed earlier with reference to block 328 of process 300. The discussion of block 328 of process 300 is fully applicable to block 328 of process 800, and is not repeated for brevity.

After receiving at block 326 the at least one notification indicative of the identified at least one instance of the first event (notification that the vehicle of the missing person was detected by SVC 108-1), including image data of the identified at least one instance of the first event, operator 402 views the image data, and provides location and time information to dispatch so that members of the police enforcement agency on duty are informed of the location of the missing person.

In some implementations, the subset of at least one image capture device identified at block 808 is further limited in addition to image capture devices positioned in the first geographic area within the first period of time. In an exemplary implementation, the subset of image capture devices is further limited to image capture devices at vehicles of certain vocation. In this context, "vocation" takes the same meaning as defined earlier.

In some implementations, process 800 further comprises receiving (e.g. by client device 104 or cloud server 106) an indication of a first vehicle vocation. In some scenarios, at block 808, the identified subset of at least one image capture device is further limited to image capture devices which are included in vehicles of the first vocation. In other scenarios, at block 808, the identified subset of at least one image capture device is further limited to image capture devices which are included in vehicles of different vocation than the first vocation.

In an exemplary implementation, the plurality of image capture devices 108 are mounted on vehicles 110 including public transportation vehicles, (e.g., buses, trains), service vehicles, other municipally owned and operated vehicles, and police cruisers from a plurality of police enforcement agencies, including police enforcement agencies from two different municipalities.

In one exemplary scenario, image capture devices 108 (or peripheral devices communicatively coupled thereto) mounted on police cruisers associated with a first municipality are currently processing video data for detecting a second event associated with a second geographic area and second period of time (geographic areas and periods of time are not necessarily exclusive to each other).

As such, to avoid interruption of the ongoing processing by image capture devices 108 mounted on police cruisers associated with a first municipality (i.e. vehicles of a first vocation), the subset of at least one image capture device is limited to exclude image capture devices at vehicles of the first vocation. That is, the subset of at least one image capture device is further limited to image capture devices which are included in vehicles of different vocation than the first vocation.

In the presented example of searching for a missing person, block 808 of process 800 entails identifying any of the plurality of image capture devices 108 mounted to vehicles 110 including public transportation vehicles, municipally owned and operated vehicles and police cruisers from the second police enforcement agency only (not the first police enforcement agency), positioned in the first geographic area 506 within the first period of time, Oct. 26, 2021, (today) 11 AM (now) until 6 PM.

In another exemplary scenario, image capture devices 108 (or peripheral devices communicatively coupled thereto) mounted on police cruisers are generally reserved for detecting instances of events associated with dangerous situations, criminal activity, or missing persons. As such, for events unrelated to dangerous situations, criminal activity, or missing persons, the subset of at least one image capture device is limited to image capture devices at vehicles of a first vocation (where the first vocation is selected as a vocation which is different from police or law enforcement). That is, the subset of at least one image capture device is further limited to image capture devices which are included in vehicles of the first vocation. In an example where detection of faulty infrastructure is desired, block 808 of process 800 entails identifying any of the plurality of image capture devices 108 mounted to service vehicles 110, which capture image data in the first geographic area within the first period of time. Conversely, in the presented example where identification of the missing person (or the vehicle of the missing person) is desired, the subset of at least one image capture device is not limited to only vehicles in the first vocation.

Limiting the subset of at least one image capture device based on vehicle vocation can be performed in a plurality of different ways. In some implementations, an operator 402 is knowledgeable as to what vocations of vehicle should be used for a given detection. In an example, operator 402 selects all image capture devices 108, other than image capture devices mounted to police cruisers associated with the first municipality (which are known to be busy), for detecting the missing person, in the above presented example. In other implementations, detection of vehicle vocations which are already performing a detection is automatically performed (e.g. by client device 104 or cloud server 106). For example, model data is already sent to a subset of image captures device in accordance with block 310 of process 800, and notifications of identification of instances of an event (or notifications of failure to detect instances of the event) have not yet been received by the client device 104 or cloud server 106. Based on this, the detection is assumed to still be running, and image capture devices in vehicles involved in this detection are excluded from a subsequently identified subset of at least one image capture devices (in another instance or iteration of process 800).

In yet other implementations, running of models can be triaged according to a priority assigned to a given detection or performing of process 800. For example, processing to identify a missing person may be assigned a high priority, whereas processing to identify infrastructure irregularities (e.g. potholes) may be assigned a relatively lower priority. Such assigning of priority could be performed by operator 402 at block 306 when providing an indication of a first model, or could be performed automatically by client device 104 or could server 106 based on the nature of the first model selected by the operator 402. For vehicles having an image capture device which is already performing processing according to a model, an assigned priority of the processing being performed is compared to a priority of processing for which a subset of image capture device is being identified at block 808. Image capture devices involved in a higher priority processing (compared to a lower priority processing for which a subset of image capture devices is being identified at 808) are excluded from a subsequently identified subset of at least one image capture devices for the lower priority processing. Conversely, for image capture devices involved in a lower priority processing (compared to a higher priority processing for which a subset of image capture devices is being identified at 808), use of a model for the lower priority processing is ceased, and the image capture devices are included in the identified subset of at least one image capture device for the higher priority processing. In the present example of searching for a missing person, image capture devices which are being used for detecting infrastructure irregularities can cease to do so, and be included in the subset of at least one image capture device which will perform processing to identify the missing person (or the vehicle used by the missing person).

Another exemplary user of a mobile video surveillance system is a municipal asset management department that employs the system for maintaining city infrastructures.

For instance, a Department of Works, Services, and Transportation (DWST) of a municipality employs a mobile video surveillance system 101A, 101B for detecting the condition of city assets. Specific and non-limiting examples of assets include, a roadway sign, (e.g., stop, yield), a streetlight, a telephone/cable service pole, a traffic control signal, a roadway, a tree, a shrub, greenery, among others.

An operator of the mobile video surveillance system may schedule asset checks at regular intervals.

In a first example, upon identifying an asset (at block 324 in process 300 or block 824 in process 800), an image capture device transmits a portion of image data including the asset to the client device 104 (e.g. via cloud server 106) at block 326 in process 300 or 800. In this example, the municipality utilizes this portion of image data to update a digital twin of their assets. A digital twin is a virtual representation of a physical object and may include parametric representation of the object's state. A library of digital twins for a plurality of assets can be stored at a non-transitory processor readable storage medium of cloud server 106, client device 104, or local server 118, as examples.

In some implementations, a trained model (used as the first model in process 300 or 800) is trained to detect when an asset is damaged or requires servicing. Some examples include a telephone/cable service pole being at an angle less than 75 degrees from the road, a streetlight being broken (e.g., bulb is off/broken), a traffic sign being angled, a traffic control signal is off and/or damaged, a roadway has damage, (e.g., pothole), a tree is damaged, among others. Upon detecting an asset that requires maintenance, the image capture device transmits a portion of image data representing the asset to the client device. The image data may then be used to update the municipality's digital twin of the asset.

In a first example, a trained model is trained to detect a light post that is not illuminated. Upon identifying an unilluminated light post (e.g. at 324 of process 300 or 824 of process 800), the image capture device transmits a portion of image data including the light post to the client device 104 (e.g. at 326 of process 300 or 800). The image data may then be used to update the municipality's digital twin if the light post, for example, is not illuminated.

Alternatively, a trained model is trained to identify an asset at 324 of process 300 or 824 of process 800. Upon identification of an asset, the image capture device transmits a portion of image data including the asset to the client device 104. The image may be analyzed to detect a condition or damage of the asset (e.g. by operator 402 manually, or automatically by at least one processor of cloud server 106, client device 104, or local server 118) to update the municipality's digital twin of the asset if the asset is damaged or requires maintenance. For example, if a light post is not illuminated.

Optionally, an operator may configure the mobile video surveillance system to perform asset checks on an as-needed basis. For example, an operator may configure the system to detect trees that have broken and require removal after severe storm.

FIGS. 9, 10, 11, 12, 13 and 14 discussed below illustrate several exemplary events which models can be trained to identify. These exemplary events are non-limiting, and models could be trained to detect many more events, and many more types of events, than those illustrated.

Figure 9:
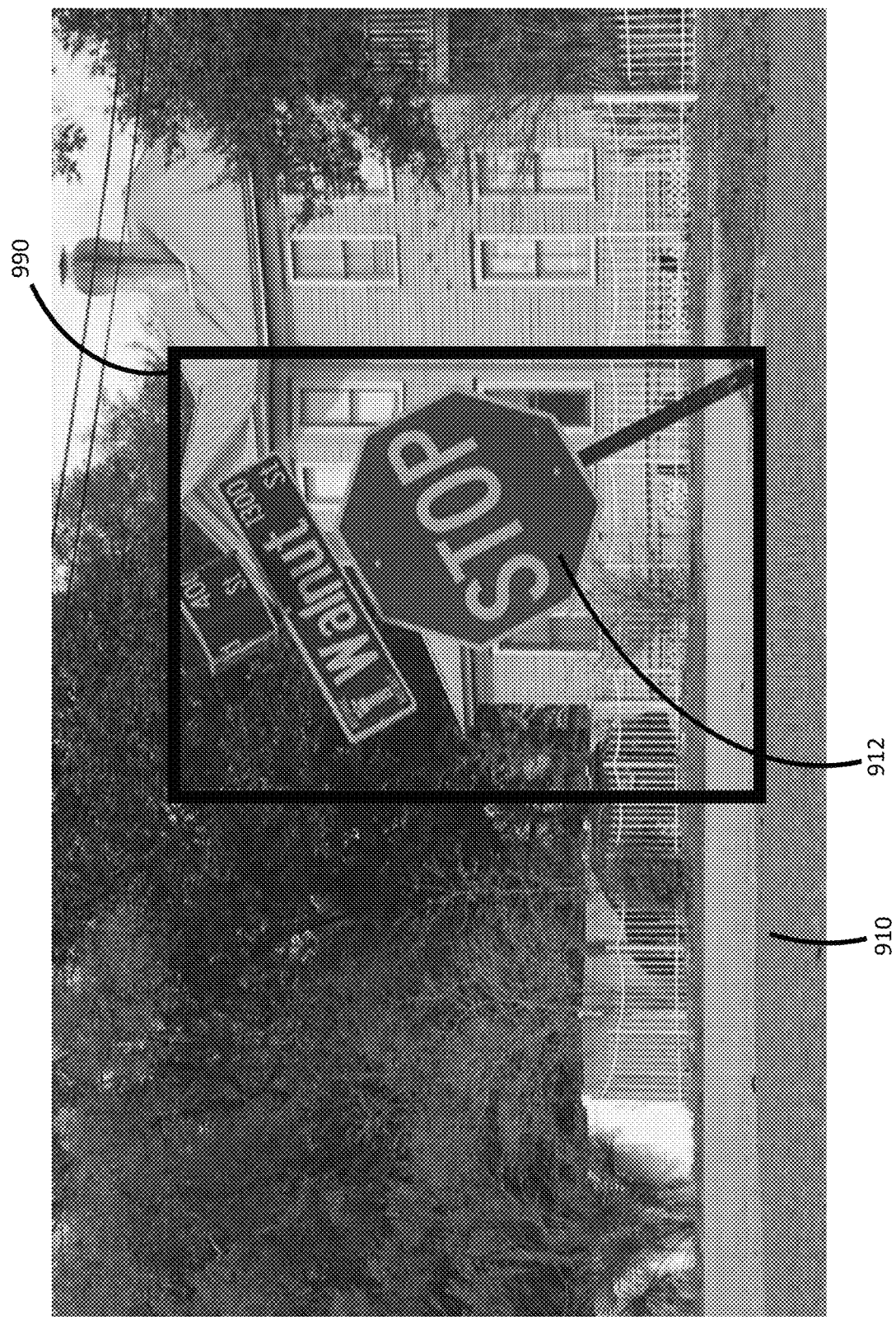
FIGS. 9, 10, 11, 12, 13, and 14 are images which illustrate exemplary events that models can be used to detect.

FIG. 9 is an image which shows a road sign 912 positioned proximate a road 910. Normally, a road sign should stand vertically (i.e. at approximately a 90 degree angle) to a road. A model can be trained to detect road signs (or other infrastructure) which are crooked relative to a road (indicated by detection box 990), and provide a notification indicating that the infrastructure needs servicing or repair.

Figure 10:
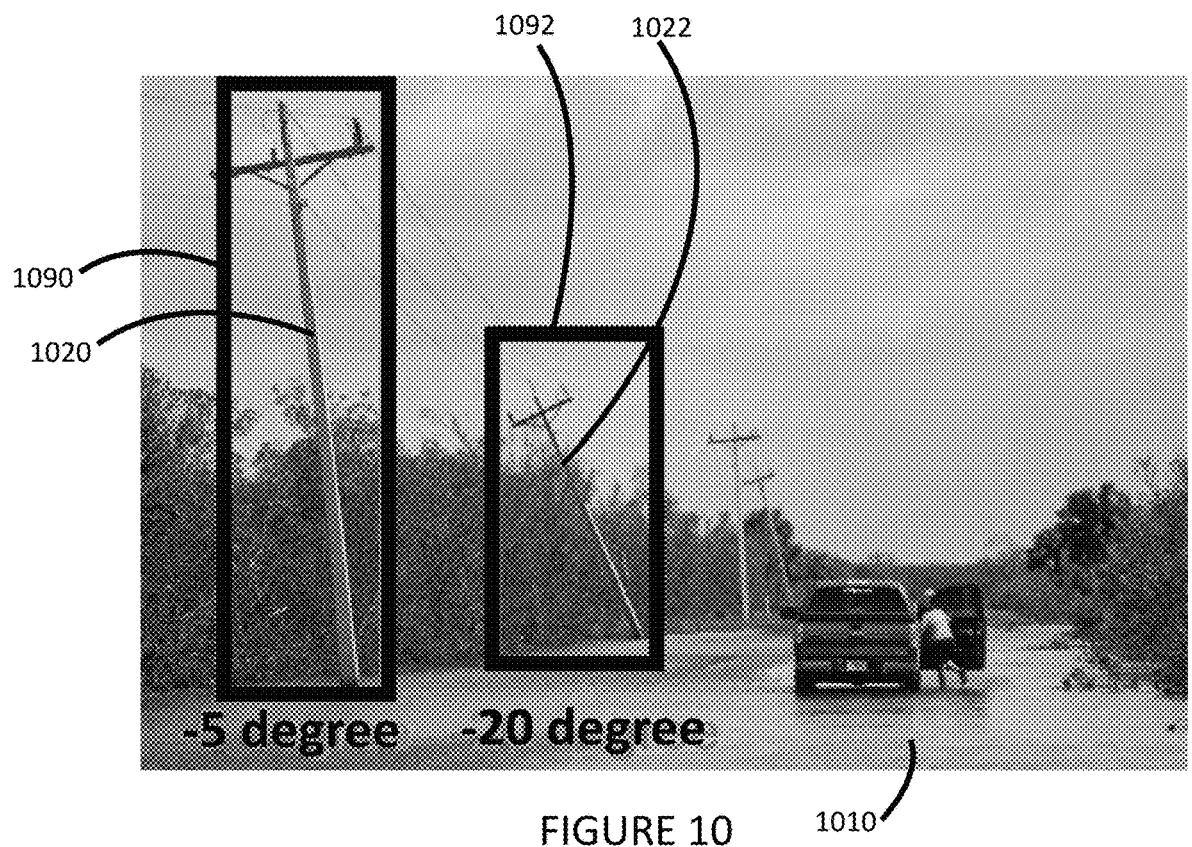

FIG. 10 is an image which shows utility poles 1020 and 1022 positioned proximate a road 1010. Normally, utility poles should stand vertically (i.e. at approximately a 90 degree angle) to a road. A model can be trained to detect utility poles (or other infrastructure) which are crooked relative to a road (indicated by detection boxes 1090 and 1092 around poles 1020 and 1022, respectively), and provide a notification indicating that the infrastructure is faulty. Further, the model can be trained to detect severity of infrastructure defect. In the illustrated example, pole 1020 is detected as being −5 degrees from vertical, and pole 1022 is detected as being −20 degrees from vertical. These detected values can be included in the notification indicating detection of the faulty infrastructure, which is useful for understanding severity of the situation.

Figure 11:
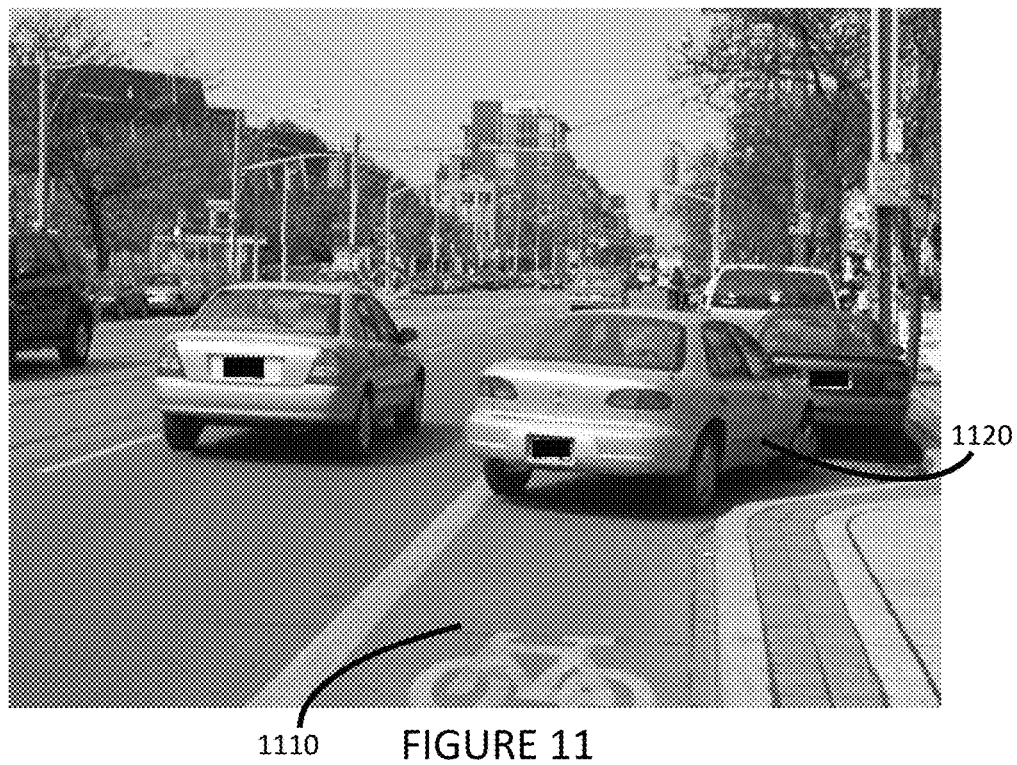

FIG. 11 is an image which shows a parked vehicle 1120 obstructing a bicycle lane 1110. A model can be trained to detect such misuse of roads and infrastructure, and provide a notification to law enforcement for issuing penalties as appropriate.

Figure 12:
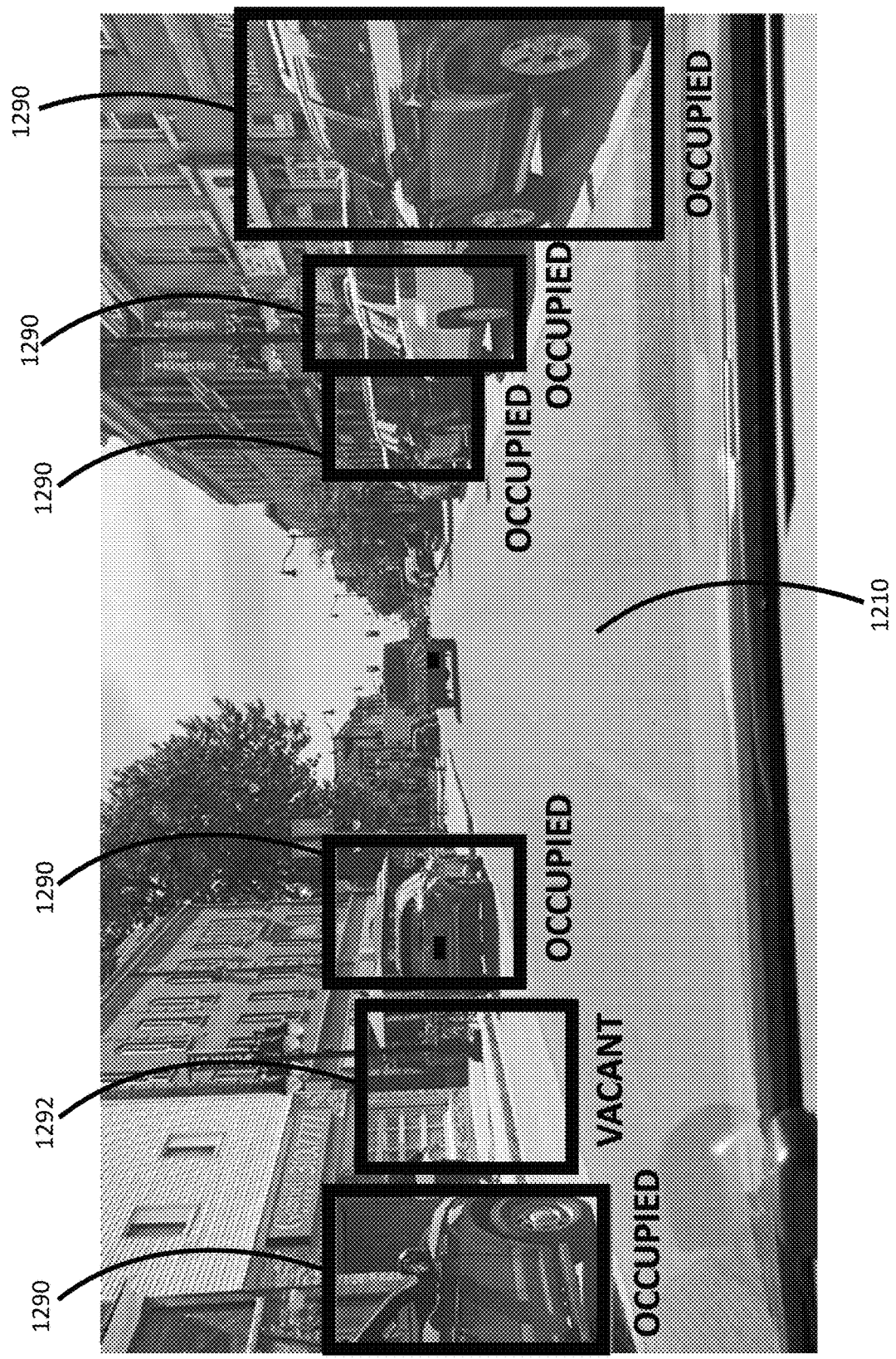

FIG. 12 is an image which shows curb-side parking use along a road 1210. A model can be trained to detect whether parking spaces are occupied by vehicles or are vacant. In FIG. 12, of the visible parking spaces, five are occupied as shown by detection boxes 1290, and one space is vacant as shown by detection box 1292. A notification can be provided (possibly after more driving to view more parking spaces) which indicates available or occupied parking spaces (or aggregated numbers of the same), which is useful to assess the extent of parking usage.

Figure 13:
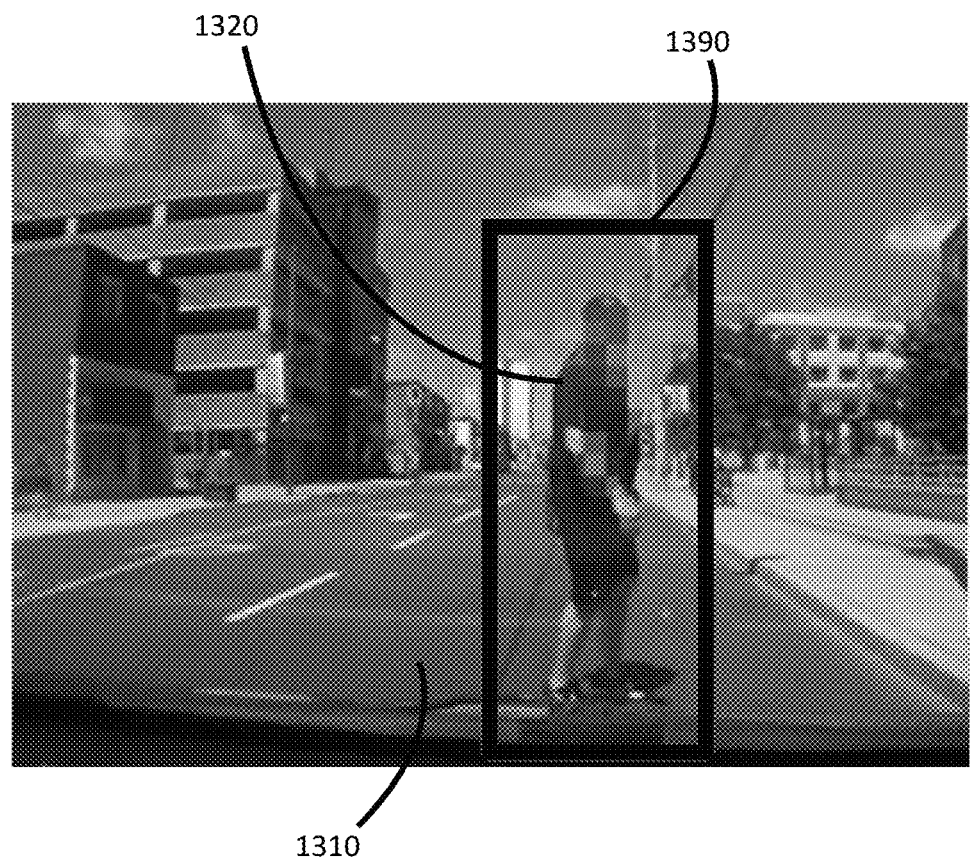

FIG. 13 is an image which shows a pedestrian 1320 on a road 1310 in front of a vehicle (in which an image capture device is positioned which captures the image shown in FIG. 13). A model can be trained to detect pedestrians (pedestrian 1320 is detected as shown by detection box 1390), to provide notifications of their behavior. This is useful for example in infrastructure planning (e.g. implementing a cross-walk or pedestrian bridge in an area where jaywalking is common).

Figure 14:
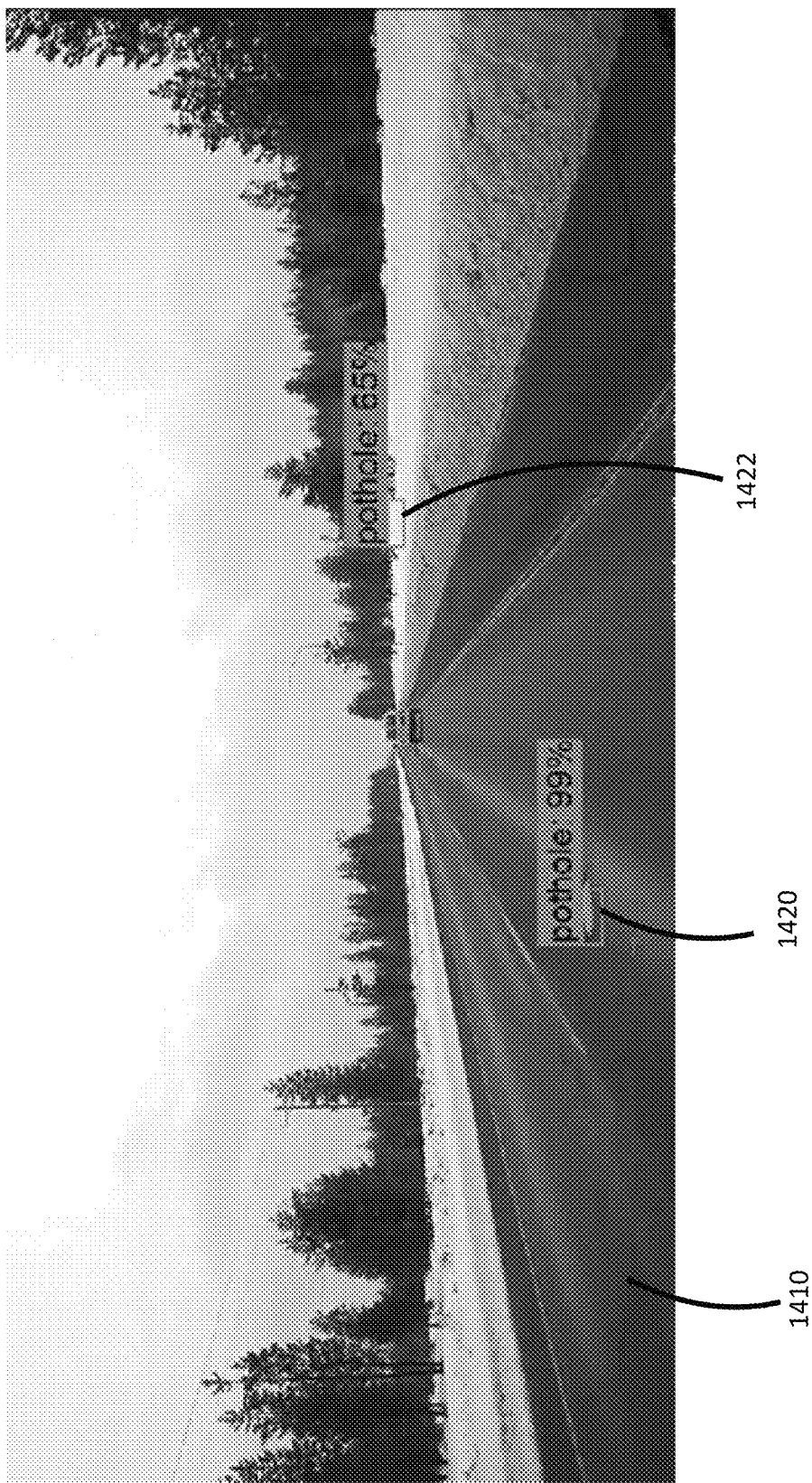

FIG. 14 is an image showing a road 1410 having a pothole 1420 thereon. A model can be trained to detect infrastructure defects or faults, such as potholes. A notification of such defect is sent to an appropriate entity to inform them of said defects for servicing or repair. FIG. 14 also shows a false-detection of a pothole 1422. Pothole 1420 is detected with 99% certainty, and thus is included in a notification reporting the defect. On the other hand, "pothole" 1422 is detected with a lower certainty (65%), and thus may not be reported in a notification, to avoid overburdening system or reviewers with incorrect analysis.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

Throughout this disclosure, various devices are described as performing acts. In such disclosure, components of said devices can be interpreted as performing said acts. For example, acts or processing, identifying, determining, or similar can be performed by at least one processor of the device performing said acts. As another example, acts of storing or similar can be performed by at least one non-transitory processor-readable storage medium of the device performing said acts. As yet another example, acts of communication or transmission can be performed by at least one communication interface or communication pathway associated with the device performing said acts.

What is claimed is:

1. A system comprising a plurality of image capture devices and a management device, the system operable to:
    receive, by the management device, an indication of a first geographic area and a first period of time;
    receive, by the management device, an indication of a first detection model of a plurality of detection models, the first detection model for analyzing image data and detecting a first event;
    identify, by at least one processor of the management device, a subset of at least one image capture device of the plurality of image capture devices, the subset of at least one image capture device being limited to image capture devices which capture image data in the first geographic area within the first period of time; and
    after the subset of at least one image capture device is identified, transmit, by the management device, first model data to each image capture device in the subset of at least one image capture device, the first model data including the first detection model for detecting the first event,
    wherein each image capture device in the subset of at least one image capture device is operable to:
        store, by at least one non-transitory processor-readable storage medium of the respective image capture device, the first model data from the management device;
        process, by at least one processor of the respective image capture device, image data stored at the at least one non-transitory processor-readable storage medium of the respective image capture device according to the first detection model, to identify any instances of the first event; and
        transmit a notification to be received by the management device, the notification indicative of any identified instances of the first event.

2. The system of claim 1, wherein:
    the system is further operable to transmit, by the management device to each image capture device in the subset of at least one image capture device, time period data indicative of the first period of time; and
    each image capture device in the subset of at least one image capture device being operable to process image data stored at the at least one non-transitory processor-readable storage medium of the respective image capture device according to the first detection model, comprises: each image capture device in the subset of at least one image capture device being operable to process select image data captured by a respective image capture device within the first period of time.

3. The system of claim 1, wherein:
    the system is further operable to transmit, by the management device to each image capture device in the subset of at least one image capture device, geographic data indicative of the first geographic area; and
    each image capture device in the subset of at least one image capture device being operable to process image data stored at the at least one non-transitory processor-readable storage medium of the respective image capture device according to the first detection model comprises: each image capture device in the subset of at least one image capture device being operable to process select image data captured by a respective image capture device in the first geographic area.

4. The system of claim 1 wherein identification of any instance of the first event includes at least one of detecting a first person, an object, status of a person, status of an object, status of infrastructure, or an activity.

5. The system of claim 1 wherein the system being operable to identify the subset of at least one image capture device of the plurality of image capture devices comprises the system being operable to:
    for each image capture device of the plurality of image capture devices, receive by the management device location data and time data for the respective image capture device indicative of geographic location of the respective image capture device over time; and identify the subset of at least one image capture device as including each image capture device where the respective location data and time data indicates that the respective image capture device was in the first geographic area within the first period of time.

6. The system of claim 1 wherein the system being operable to identify the subset of at least one image capture device of the plurality of image capture devices comprises the system being operable to:

transmit, by the management device to each image capture device in the plurality of image capture devices, first request data indicative of the first geographic area and the first period of time;

at each image capture device in the plurality of image capture devices:

determine, by the respective at least one processor of the respective image capture device, whether historical image data stored in the respective at least one non-transitory processor-readable storage medium was captured in the first geographic area within the first period of time; and transmit, to the management device, an indication that the respective image capture device captured image data in the first geographic area within the first period of time; and include in the subset of at least one image capture device, each image capture device from which an indication that the respective image capture device captured image data in the first geographic area within the first period of time.

7. The system of claim 1 wherein the indication of the first geographic area indicates an area based on at least one of, GPS coordinates, street address, cross streets, city, community, state, province, country, and cell of a hierarchical geospatial indexing system.

8. The system of claim 1 wherein the system being operable to receive, by the management device, an indication of the first detection model of a plurality of detection models includes: the system being operable to receive, by the management device, a user input by a user interface, the user input indicating a selection by the user of the first detection model.

9. The system of claim 1 wherein the system being operable to receive the indication of the first geographic area and the first period of time comprises the system being operable to:

display a user interface on a display of a user device, the user interface including an interactive map;

receive a user input indicating the first geographic area on the interactive map; and receive another user input indicating the first period of time via the user interface of the user device.

10. The system of claim 9 wherein the system being operable to receive a user input indicating the first geographic area on the interactive map comprises the system being operable to receive a user input selected from a group of user inputs consisting of:

a user-input polygon on the interactive map indicative of a boundary of the first geographic area;

a user selection of selectable regions on the interactive map; and a user selection of at least a portion of one or more streets on the interactive map.

11. The system of claim 9 wherein the system being operable to receive another user input indicating the first period of time via the user interface comprises: the system being operable to receive a user input to a time slider displayed on the user interface for indicating a start time and end time of the first period of time.

12. The system of claim 1, wherein the system is further operable to receive, by the management device, an indication of a first vehicle vocation, wherein the subset of at least one image capture device is further limited to image capture devices which are included in vehicles of different vocation than the first vocation.

13. The system of claim 1, wherein the system is further operable to receive, by the management device, an indication of a first vehicle vocation, wherein the subset of at least one image capture device is further limited to image capture devices which are included in vehicles of the first vocation.

14. The system of claim 1, wherein the system is further operable to: for each image capture device in the subset of image capture devices, after processing image data according to the first detection model to identify any instances of the first event, cease use of the first detection model stored at the respective image capture device.

15. The system of claim 14, wherein for each image capture device in the subset of image capture devices, the system being operable to cease use of the first detection model stored at the respective image capture device comprises: each image capture device in the subset of image capture devices being operable to remove the first model data from the at least one non-transitory processor-readable storage medium of the respective image capture device.

* * * * *